(12) United States Patent
Ito

(10) Patent No.: US 6,345,039 B1
(45) Date of Patent: Feb. 5, 2002

(54) DEVICE AND METHOD FOR CONTROLLING ATM TRAFFIC

(75) Inventor: Syuji Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/091,775

(22) PCT Filed: Oct. 24, 1997

(86) PCT No.: PCT/JP97/03861

§ 371 Date: Jun. 22, 1998

§ 102(e) Date: Jun. 22, 1998

(87) PCT Pub. No.: WO98/19423

PCT Pub. Date: May 7, 1998

(30) Foreign Application Priority Data

Oct. 30, 1996 (JP) .............................................. 8-288191

(51) Int. Cl.[7] .................................................. H04L 1/16
(52) U.S. Cl. ..................................................... 370/232
(58) Field of Search ................................ 370/395, 389, 370/499, 401, 428, 470, 465, 351, 352, 229, 230–235, 312, 320, 232, 233, 234, 237, 905, 906, 902, 914

(56) References Cited

U.S. PATENT DOCUMENTS 5,673,266 A * 9/1997 Li ............................ 370/465

5,859,843 A * 1/1999 Honkasalo et al. ......... 370/441

FOREIGN PATENT DOCUMENTS

| JP | 5191436 | 7/1993 |
| JP | 7321796 | 8/1995 |

OTHER PUBLICATIONS

Dravida et al., "Analysis and Engineering of a Voice/Data Packet Multiplexer", IEEE Transactions on Communications, vol. 41, No. 11, Nov. 1991, pp. 1657–1667.

Hiroshi et al., "Controlling Feedback Congestion for ABR Services", ATM–LAN, Feb. 10, 1995.

* cited by examiner

*Primary Examiner*—Dang Ton
(74) *Attorney, Agent, or Firm*—Leydig, Voit, & Mayer, Ltd.

(57) ABSTRACT

In an asynchronous transfer mode (ATM) communications apparatus and method, the number of sound cells arriving from sound terminals via a sound traffic ATM line terminating unit is monitored, a rate calculation circuit predicts the number of sound cells arriving at a next cycle, and provides a prediction value and transmission rate at which the nodes, such as an ATM multiplexed transmitter and an ATM switched network, can transfer the cells. A data traffic controlling cell processing circuit sets a transfer transmission rate while relaying the data traffic controlling cells and notifies a data ATM terminal of the set transmission rate via t a data traffic ATM line terminating unit. The transmission rate of the data ATM terminals can be adjusted in accordance with the use condition of the lines by sound connections.

20 Claims, 36 Drawing Sheets

EXAMPLE OF CONNECTION INFORMATION
0 : SIGNALING
1 : SOUND
2 : DATA

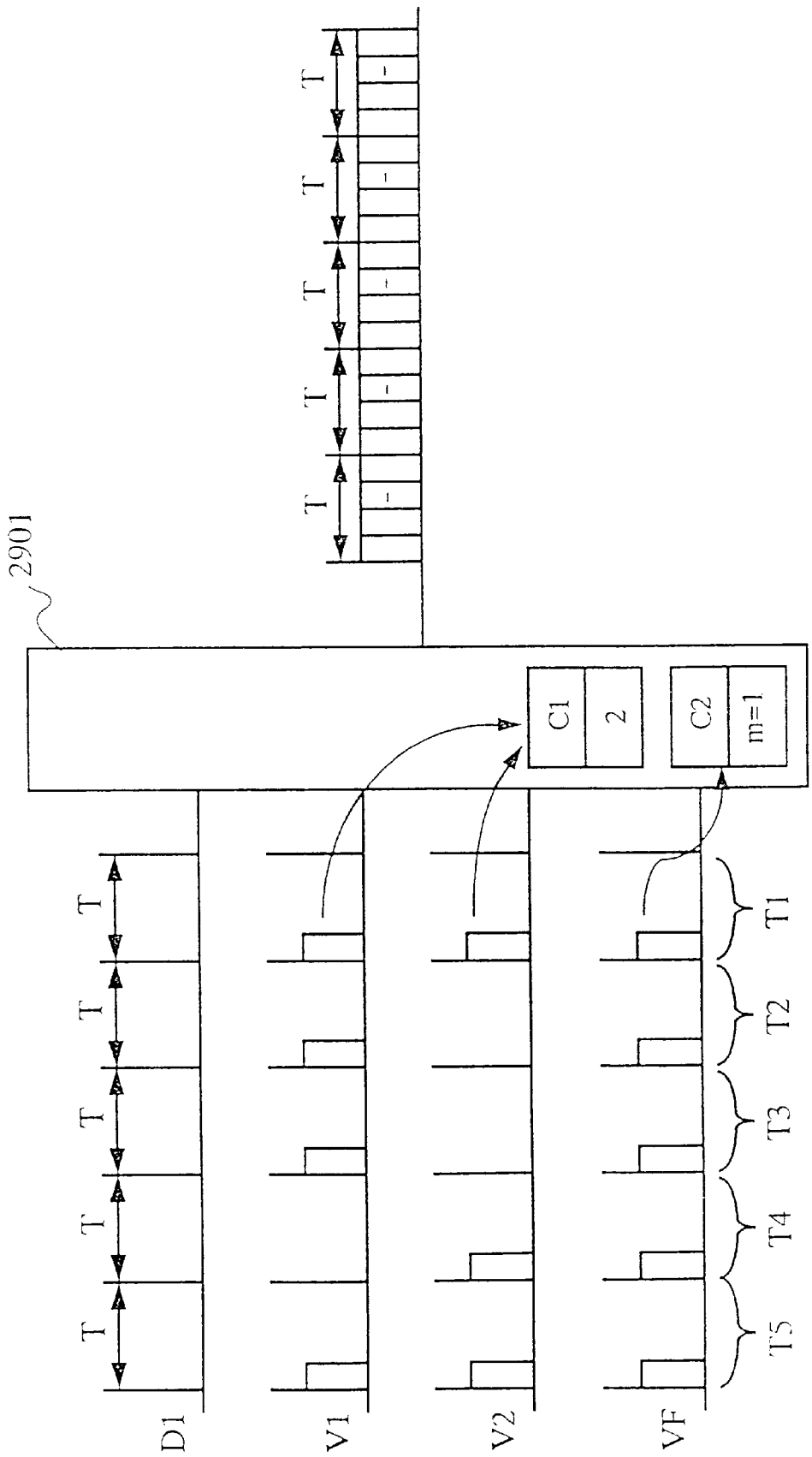

DEVICE AND METHOD FOR CONTROLLING ATM TRAFFIC

This invention relates to an Asynchronous Transfer Mode (ATM) traffic controlling apparatus and an ATM traffic controlling method for controlling a traffic of multiplexed multimedia information such as sound, data, image, and so on, which is transmitted in asynchronous transfer mode.

BACKGROUND ART

The ATM has become the focal point of attention as the mainstream technology for a wide area Integrated Service Digital Network or ISDN.

FIG. 28 shows the structure of a cell used for ATM.

A cell 2801 to be used for ATM, a cell header 2802 which contains controlling information of cell 2801, and cell information 2803 having data information and sound information of cell 2801 are shown in FIG. 28. For ATM, any information in cell information 2803, such as sound, data, image, facsimile, etc., is partitioned into a fixed length in cell information 2803. The cell information 2803 is provided with cell header 2802 which contains logical channel (Virtual Call Indicator (VCI)) information, etc., required for switching cell 2801. The cell header and the cell information form the cell 2801. This cell 2801 format enables integrated transmission. Particularly, for a private in-house communication, where sound communication and inter-local area network (LAN) communication are the typical form of data communication, it is expected that the integration of this traffic and the ATM technology will help construct a more efficient transmission network than ever before.

FIG. 29 shows an example of the network configuration of sound/data integrated network using ATM.

In FIG. 29, an ATM multiplexed transmitter 2901, an ATM switched network 2902, a data ATM terminal 2903 for setting data connection and sending data cells, a sound ATM terminal 2904 for setting sound connection and sending sound cells, a private data traffic ATM line 2905, a private sound traffic ATM line 2906, a wide area ATM line 2907 for connecting ATM multiplexed transmitter 2901 and ATM switched network 2902, a data traffic ATM line terminating unit 2908, provided in ATM multiplexed transmitter 2901, to be connected to data ATM terminal 2903 via private data traffic ATM line 2905, a sound traffic ATM line terminating unit 2909, provided in ATM multiplexed transmitter 2901, to be connected to sound ATM terminal 2904 via private sound traffic ATM line 2906, and a multiplexed transmitting unit 2910 provided in ATM multiplexed transmitter 2901 are illustrated.

Next, the operation is explained.

In ATM multiplexed transmitter 2901, a cell received by data-system ATM line terminating unit 2908 and a cell received by sound-system ATM line terminating unit 2909 are multiplexed by multiplexed transmitting unit 2910, and sent to wide area ATM line 2907.

An efficient use of wide area ATM line 2907, shown in FIG. 29 is required for in-house communication. Because about 50 percent of sound communication is normally soundless, sound ATM terminal 2904 transmits sound information (hereinafter called a sound cell) consisting of only sound by private sound traffic ATM line 2906 at every cell forming cycle (a cycle being a time period during which sound is transformed into a cell), and tries not to transmit soundless portion so as to increase line efficiency.

Meanwhile, because real-time is generally in higher demand in sound communication than in data communication, ATM multiplexed transmitter 2901 gives preference to sending sound cells transmitted by sound ATM terminal 2904 to wide area ATM line 2907. The data information (hereinafter a data cell) transmitted by data ATM terminal 2903 is transmitted to wide area ATM line 2907 using idle time during which no sound cell to be sent exists.

A method of realizing the conventional multiplexed transmitting unit 2910 for sound and data multiplexed transmission in ATM is set forth in *Analysis and Engineering of A Voice/Data Packet Multiplexer* of IEEE Transaction of Communication Vol.41 No. 11, pages 1656 to 1667.

FIG. 30 shows a configuration of the conventional multiplexed transmitting unit 2910, where, a sound/data identifying unit 3001 for identifying whether a received cell is sound or data, a data cell transmitting buffer 3002 for storing data cells for transmission, a sound cell transmitting buffer 3003 for storing sound cells for transmission, a transmitting circuit 3004 for transmitting sound or data cells, a receiving circuit 3005 for receiving sound or data cells, and a receiving buffer 3006 for storing sound or data cells received by receiving circuit 3005 are depicted.

The operation is explained next.

In FIG. 30, sound/data identifying unit 3001 identifies whether or not a cell is a sound cell or a data cell upon its arrival from data traffic ATM line terminating unit 2908 or sound traffic ATM line terminating unit 2909. A sound cell is stored in sound cell transmitting buffer 3003 and a data cell is stored in data cell transmitting buffer 3002.

Then, transmitting circuit 3004 reads the sound cell from sound cell transmitting buffer 3003 and transmits into wide area ATM line 2907. If no sound cell is stored in transmitting buffer 3003 and the data cells are stored in data cell transmitting buffer 3002, the data cells are read and transmitted into wide area ATM line.

Meanwhile, cells arriving from other terminals by way of wide area ATM line 2907 are received by receiving circuit 3005 and stored in receiving buffer 3006, and then transmitted to data traffic ATM line terminating unit 2908 or sound traffic ATM line terminating unit 2909. Sound and data multiplexed transmission is realized in this way by giving preferential transmission to sound cells using separated buffers.

However, when the volume of traffic of sound cells grows heavy, the probability for data cells being kept waiting in the data cell transmitting buffer increases, which may result in buffer overflow destroying part of cells if the capacity of the data cell transmitting buffer is insufficient. On the other hand, in order to suppress the cell disposal rate within an appropriate range in an event of buffer overflow, a large capacity is required for the data cell transmitting buffer.

For the application of ATM to a wide area network data communication such as inter-LAN communication, it is recently become known that communication efficiency gets degraded significantly if the cell disposal rate could not be suppressed. ABR Service Class Quality Assessment by the National Convention for Electronics Information Communication Academy SB-10-5 in 1996, presented with an effective measure using a data terminal capable of adjusting a transmission rate depending on the network load.

FIG. 31 is a diagram showing an adjustment sequence of the transmission rate. It shows the transmission sequence of data ATM terminal 2903a in normal mode.

FIG. 32 shows an adjustment sequence of the transmission rate for data ATM terminal 2903a in abnormal mode.

FIG. 33 shows the structure of a data traffic control cell (hereinafter an RM cell) format for controlling the data traffic indicated in sequences of FIGS. 31 and 32.

In FIG. 33, a cell 3301, a header 3302 indicating the RM cell, information 3303 of cell 3301, and a transfer rate specified value 3304 included in information 3303 are illustrated.

How to adjust the transmission rate is discussed below with reference to FIG. 31.

Data ATM terminal 2903a on the transmitting side is assumed to have a predetermined number of times (Nrm−1). Nrm indicates the ratio of transmitting RM cells, e.g., the number of cells per RM interval. Each time the predetermined number of times (Nrm−1) of data cells are transmitted, an RM cell (called a forward RM cell) is transmitted once. Data ATM terminal 2903b on the receiving side returns a RM cell (called a backward RM cell) to data ATM terminal 2903a on the transmitting side. The backward RM cell contains transfer rate specified value 3304 indicated as the valid transmission rate by data ATM terminal 2903a shown in FIG. 33.

In FIG. 31, cycle Td is a cycle to change the transmission rate of data ATM terminal 2903a. Because cycle Td depends on the ratio Nrm for transmitting the RM cells, cycle Td dynamically changes with the changes in the transmission rate.

In returning the backward RM cell, data ATM terminal 2903b on the receiving side sets a transfer rate that can be processed by its own as transfer rate specified value 3304 shown in FIG. 33. When the backward RM cell is returned to data ATM terminal 2903a on the transmitting side via ATM multiplexed transmitter 2901 or ATM switched network 2902, if the set transfer rate specified value 3304 exceeds the transfer rate that can be processed by ATM multiplexed transmitter 2901 or ATM switched network 2902, the ATM multiplexed transmitter 2901 or ATM switched network 2902 hereinafter the ATM multiplexed transmitter 2901 or ATM switched network 2902 may be referred to as the node) resets transfer rate specified value 3304 of the RM cell to the transfer rate that can be processed by its own, and relays.

When the backward RM cell has arrived at the transmitting side, the minimum transfer rate that can be processed by the nodes provided for the route through which the cell passes is designated as transfer rate specified value 3304. In other words, for transfer rate specified value 3304 of the RM cells, the transfer rate that can be processed by a bottleneck node of the route is specified. Upon reception of the backward RM cell, data ATM terminal 2903a adjusts the cell transmission interval according to the transfer rate specified value 3304 of the received cell, and continues transmission.

The transfer controlling which dynamically follows up the networking condition is thereby realized.

FIG. 32 shows an adjustment sequence when the backward RM cell would not be sent to the transmitting side for some reason. In such a case, if the backward RM cell cannot be received even when data ATM terminal 2903a sends the forward RM cell based on the designated number of times (hereinafter Crm. Crm means the number of outstanding forward RM cells allowed before cutoff.), the cell is transmitted by lowering transmission rate. That is, when the backward RM cell cannot be received, the transmission rate is automatically suppressed judging that network congestion has occurred. This mechanism thus automatically suppresses congestion.

Such method for data ATM terminal 2903 of controlling the transmission rate allows the adjustment of the transfer rate according to the networking condition. ATM multiplexed transmitter 2901 or ATM switched network 2902 can prevent congestion without requiring a large buffer. However, in order for this mechanism to work, the nodes of the network, namely, ATM multiplexed transmitter 2901 or ATM switched network 2902 must be able to grasp the transfer rate they can handle, and specify the rate to the transmission terminals. Although an accurate controlling is required for an in-house communication network, for which the efficient use of wide area ATM line 2907 is vital, there were no effective measures.

The conventional ATM multiplexed transmitter has a problem of requiring a large buffer for suppressing the disposal rate of data cells, because sound cells were transmitted in preference to data cells in the conventional art of sound and data multiplexed transmission.

In addition, the data terminal on the transmitting side lacks an ATM traffic controlling unit for adjusting the transmission rate, so as to make the nodes, such as the ATM multiplexed transmitter or the ATM switched network, tailor the transmission rate that they can process.

This invention aims at overcoming above-mentioned problems. It aims at realizing an ATM traffic controlling apparatus and an ATM traffic controlling method for keeping the disposal rate of data cells within an appropriate range when traffic from data terminals grows heavy, without requiring a large buffer.

SUMMARY OF THE INVENTION

The ATM traffic controlling apparatus of this invention is characterized by an ATM traffic controlling apparatus, incorporated in an ATM multiplexed transmitter, for accommodating a plurality of sound connections for transferring sound information using sound cells among sound ATM terminals and a data connection for transferring data information to be communicated among data ATM terminals using data cells and data traffic controlling cells (hereinafter RM cells) in an ATM line may comprise a transmission rate determining unit for monitoring an arriving condition of the sound cells for the plurality of sound connections being sent from sound ATM terminals at a determined cycle, for predicting a number of sound cells to be arriving at a next cycle and for determining a transmission rate of a data traffic; and a transmission rate changing unit for receiving the data traffic controlling cells from the ATM line, for setting the transmission rate to the data traffic controlling cells, and for transmitting to the data ATM terminal.

The ATM traffic controlling apparatus of this invention is characterized by the ATM traffic controlling apparatus which may comprise a transmitting buffer for receiving the data cells from the data ATM terminal and the sound cells from the sound ATM terminals, and for storing the cells, a transmitting circuit for transmitting the cells from the transmitting buffer, a rate calculation circuit for obtaining a prediction coefficient based on the number of sound connections connected simultaneously, and for calculating a transferable rate based on the prediction coefficient and the number of sound cells to be arriving, an RM cell processing circuit for processing the RM cells including a transfer rate specified value which specifies a transfer rate for the data ATM terminal on a transmitting side, a receiving circuit for receiving the cells, and a receiving buffer for storing received data cells, and wherein the RM cell processing circuit may replace the transfer rate specified value in the RM cells with the transferable rate from the rate calculation circuit when the transferable rate from the rate calculation circuit is smaller than the transfer rate specified value in the RM cell.

The ATM traffic controlling apparatus of this invention is characterized by the ATM traffic controlling apparatus, wherein the rate calculation circuit may judge whether the sound cells are used as a sound band data, monitor the arriving condition, respectively for the sound cells having the sound information and for the sound cells of the sound band data, predict the number of sound cells to be arriving at the next cycle based on a monitored result, and may determine the transmission rate of the data traffic.

The ATM traffic controlling apparatus of this invention is characterized by the ATM traffic controlling apparatus which may comprise a transmitting buffer for storing the data cells from the data ATM terminal and sound cells from the sound ATM terminals, a transmitting circuit for transmitting the cells from the transmitting buffer, a signaling monitor circuit for monitoring a signaling information, and for providing the number of sound connections (hereinafter called the number of simultaneous connections) connected simultaneously based on the signaling information, a rate calculation circuit for obtaining a prediction coefficient based on the number of simultaneous connections, and calculating a transferable rate based on the prediction coefficient and the number of sound cells to be arriving, a RM cell processing circuit for processing the RM cells including a transfer rate specified value for specifying a transfer rate to the data ATM terminals on a transmitting side, a receiving circuit for receiving the cells, and a receiving buffer for storing received data cells.

The ATM traffic controlling apparatus of this invention is characterized by the ATM traffic controlling apparatus, wherein the rate calculation circuit may predict the arriving condition of the sound cells at the next cycle based on the number of simultaneous connections, when the number of simultaneous connections of the sound connection may exceed a specified value.

The ATM traffic controlling apparatus of this invention is characterized by the ATM traffic controlling apparatus, wherein the rate calculation circuit may predict a cycle for which the data ATM terminal changes the transmission rate and the number of cells to be arriving at this cycle based on the arriving condition of the sound cells.

The ATM traffic controlling apparatus of this invention is characterized by the ATM traffic controlling apparatus which may comprise a transmitting buffer for receiving the data cells from the data ATM terminal and the sound cells from the sound ATM terminals, and storing the cells, a transmitting circuit for transmitting the cells from the transmitting buffer, a rate calculation circuit for obtaining a prediction coefficient based on the number of sound connections connected simultaneously, and for calculating a transferable rate based on the prediction coefficient and the number of sound cells to be arriving, a RM cell processing circuit for processing the RM cells including a transfer rate specified value with which to specify a transfer rate to the data ATM terminal on a transmitting side, a receiving circuit for receiving the cells, a receiving buffer for storing received data cells, and a data monitor circuit for monitoring the arriving condition of the data cells and for calculating a cycle for which the data terminals change the transmission rate.

The ATM traffic controlling apparatus of this invention is characterized by the ATM traffic controlling apparatus, wherein the RM cell processing circuit may monitor the arriving condition of a backward RM cell, and when the backward RM cell may not be detected, the RM cell processing circuit may automatically transmit the backward RM cell.

The ATM traffic controlling apparatus of this invention is characterized by the ATM traffic controlling apparatus, wherein the RM cell processing circuit may monitor the arriving condition of the data connections for the data connection, and obtain a cycle for which the data ATM terminals change the transmission rate when a backward RM cell is not detected and a changed rate.

The ATM traffic controlling apparatus of this invention is characterized by the ATM traffic controlling apparatus, wherein the rate calculation circuit may automatically correct the prediction coefficient for calculating the number of sound cells to be arriving at the next cycle based on the arriving condition of the sound cells for the plurality of sound connections.

The ATM traffic controlling apparatus of this invention is characterized by the ATM traffic controlling apparatus, wherein the rate calculation circuit may include buffers for storing the sound cells and the data cells separately, and determine the transmission rate of the data traffic based on a storing condition of the data cells and the arriving condition of the sound cells in the plurality of sound connections.

An ATM traffic controlling method of this invention is characterized by an ATM traffic controlling method, incorporated in an ATM multiplexed transmitter, for accommodating a plurality of sound connections for transferring sound information using sound cells among sound ATM terminals and a data connection for transferring data information to be communicated among data ATM terminals using data cells and data traffic controlling cells hereinafter RM cells) in an ATM line may comprise a transmission rate determining step for monitoring an arriving condition of the sound cells for the plurality of sound connections being sent from the sound ATM terminals at a determined cycle, for predicting a number of sound cells to be arriving at a next cycle and for determining a transmission rate of a data traffic, and a transmission rate changing step for receiving the data traffic controlling cells from the ATM line, for setting the transmission rate to the data traffic controlling cells, and for transmitting to the data ATM terminal.

The ATM traffic controlling method of this invention is characterized by the ATM traffic controlling method which may comprise a transmitting buffer step for receiving the data cells from the data ATM terminal and the sound cells from the sound ATM terminals, and for storing the cells, a transmitting step for transmitting the cells from the transmitting buffer, a rate calculation step for obtaining a prediction coefficient based on the number of sound connections connected simultaneously, and for calculating a transferable rate based on the prediction coefficient and the number of sound cells to be arriving, an RM cell processing step for processing the RM cells including a transfer rate specified value which specifies a transfer rate for the data ATM terminal on a transmitting side, a receiving step for receiving the cells, and a receiving buffer step for storing received data cells, and wherein the RM cell processing step may replace the transfer rate specified value in the RM cells with the transferable rate from the rate calculation circuit when the transferable rate from the rate calculation circuit is smaller than the transfer rate specified value in the RM cell.

The ATM traffic controlling method of this invention is characterized by the ATM traffic controlling method, wherein the rate calculation step may judge whether the sound cells may be used as a sound band data, monitor the arriving condition, respectively for the sound cells having the sound information and for the sound cells of the sound band data, predict the number of sound cells to be arriving at the next cycle based on a monitored result, and determine the transmission rate of a data traffic.

The ATM traffic controlling method of this invention is characterized by the ATM traffic controlling method which may comprise a transmitting buffer step for storing the data cells from the data ATM terminal and the sound cells from the sound ATM terminals, a transmitting step for transmitting the cells from the transmitting buffer, a signaling monitor step for monitoring a signaling information, and for providing the number of sound connections (hereinafter called the number of simultaneous connections) connected simultaneously based on the signaling information, a rate calculation step for obtaining a prediction coefficient based on the number of simultaneous connections, and calculating a transferable rate based on the prediction coefficient and the number of sound cells to be arriving, a RM cell processing step for processing the RM cells including a transfer rate specified value for specifying a transfer rate to the data ATM terminals on a transmitting side, a receiving step for receiving the cells, and a receiving buffer step for storing received data cells.

The ATM traffic controlling method of this invention is characterized by the ATM traffic controlling method, wherein the rate calculation step may predict the arriving condition of the sound cells at the next cycle based on the number of simultaneous connections, when the number of simultaneous connections of the sound connection may exceed a specified value.

The ATM traffic controlling method of this invention is characterized by the ATM traffic controlling method, wherein the rate calculation circuit may predict a cycle for which the data ATM terminal changes the transmission rate and the number of cells to be arriving at this cycle based on the arriving condition of the sound cells.

The ATM traffic controlling method of this invention is characterized by the ATM traffic controlling method may comprise a transmitting buffer step for receiving the data cells from the data ATM terminal and the sound cells from the sound ATM terminals, and storing the cells, a transmitting step for transmitting the cells from the transmitting buffer, a rate calculation step for obtaining a prediction coefficient based on the number of sound connections connected simultaneously, and for calculating a transferable rate based on the prediction coefficient and the number of sound cells to be arriving, a RM cell processing step for processing the RM cells including a transfer rate specified value with which to specify a transfer rate to the data ATM terminal on a transmitting side, a receiving step for receiving the cells, a receiving buffer step for storing received data cells, and a data monitor step for monitoring the arriving condition of the data cells and for calculating a cycle for which the data terminals change the transmission rate.

The ATM traffic controlling method of this invention is characterized by the ATM traffic controlling method, wherein the RM cell processing step may monitor the arriving condition of a backward RM cell, and when the backward RM cell may not be detected, the RM cell processing circuit may automatically transmit the backward RM cell.

The ATM traffic controlling method of this invention is characterized by the ATM traffic controlling method, wherein the RM cell processing step may monitor the arriving condition of the data connections for the data connection, and obtain a cycle for which the data ATM terminals change the transmission rate when the backward RM cell may not be detected and the changed rate.

The ATM traffic controlling method of this invention is characterized by the ATM traffic controlling method, wherein the rate calculation step may automatically correct the prediction coefficient for calculating the number of sound cells to be arriving at the next cycle based on the arriving condition of the sound cells for the plurality of sound connections.

The ATM traffic controlling method of this invention is characterized by the ATM traffic controlling method, wherein the rate calculation circuit may include buffers for storing the sound cells and the data cells separately, and determine the transmission rate of data traffic based on a storing condition of the data cells and the arriving condition of the sound cells in the plurality of sound connections.

BRIEF DESCRIPTION OF THE DRAWINGS

FIG. 37 depicts an operation of the present invention.

BEST MODE FOR CARRYING OUT THE INVENTION

Embodiment 1.

Figure 1:
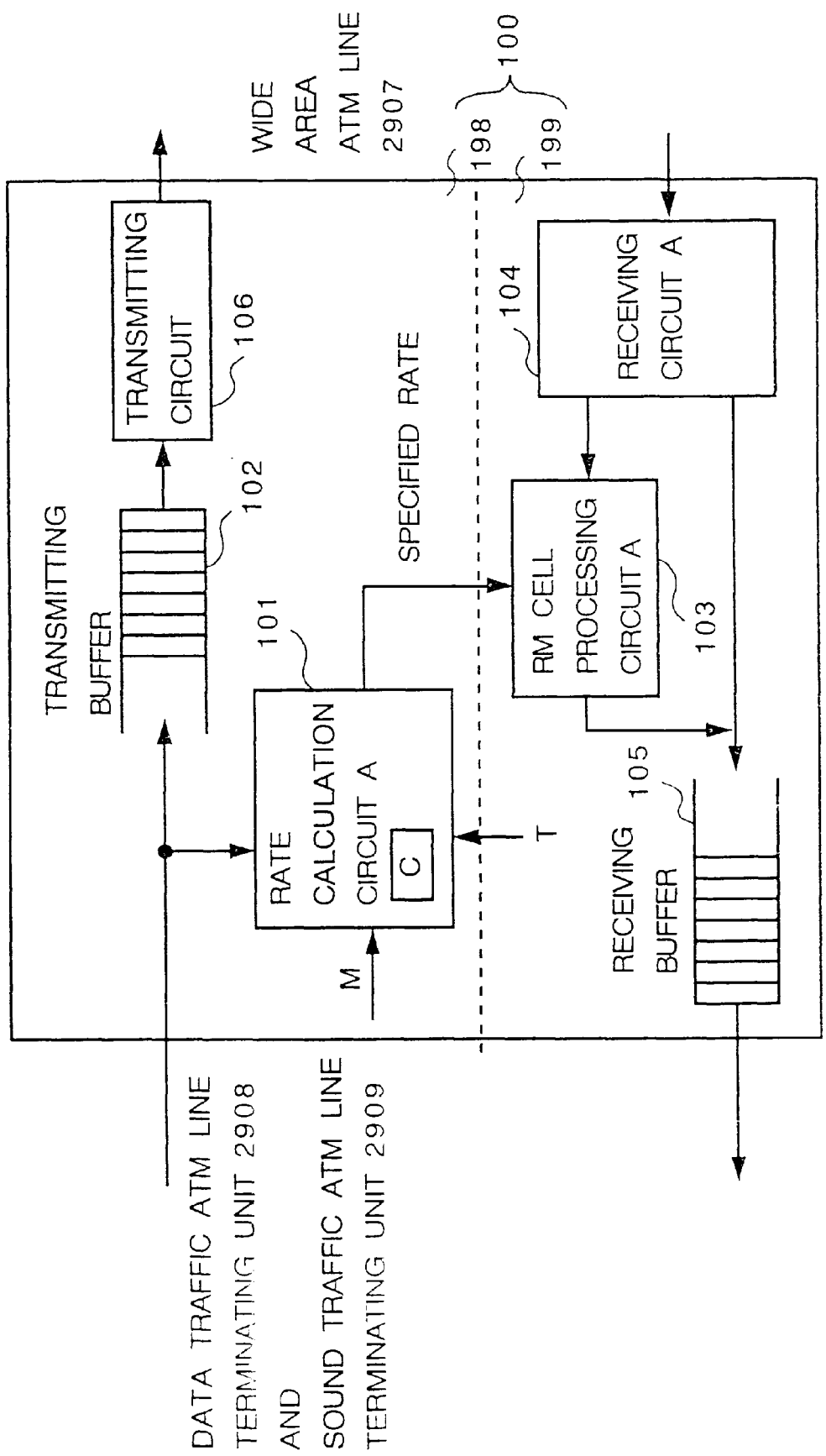
FIG. 1 shows one embodiment of an ATM traffic controlling apparatus of the present invention.

FIG. 1 shows an example of the configuration of the ATM traffic controlling apparatus of the present invention.

In the figure, a multiplexed transmitter 100, which is the ATM traffic controlling apparatus of the present invention, a rate calculation circuit A 101, a transmitting buffer 102, an RM cell processing circuit A 103, a receiving circuit A 104, and a receiving buffer 105 are illustrated. A transmission rate determining unit 198 and a transmission rate changing unit 199 are also illustrated.

Figure 2:
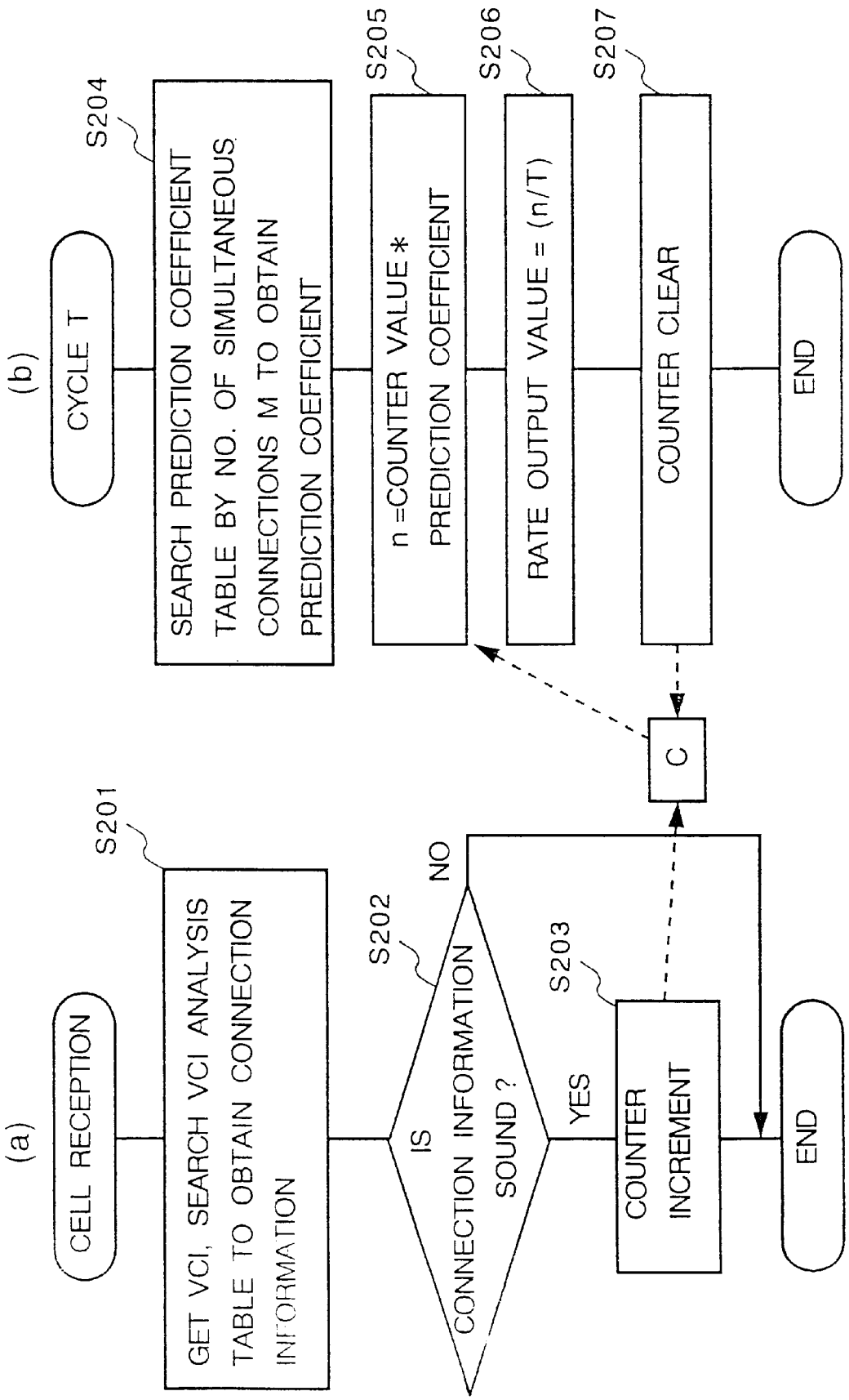
FIG. 2 outlines an operation flowchart of rate calculation circuit A 101 shown in FIG. 1.
Figure 3:
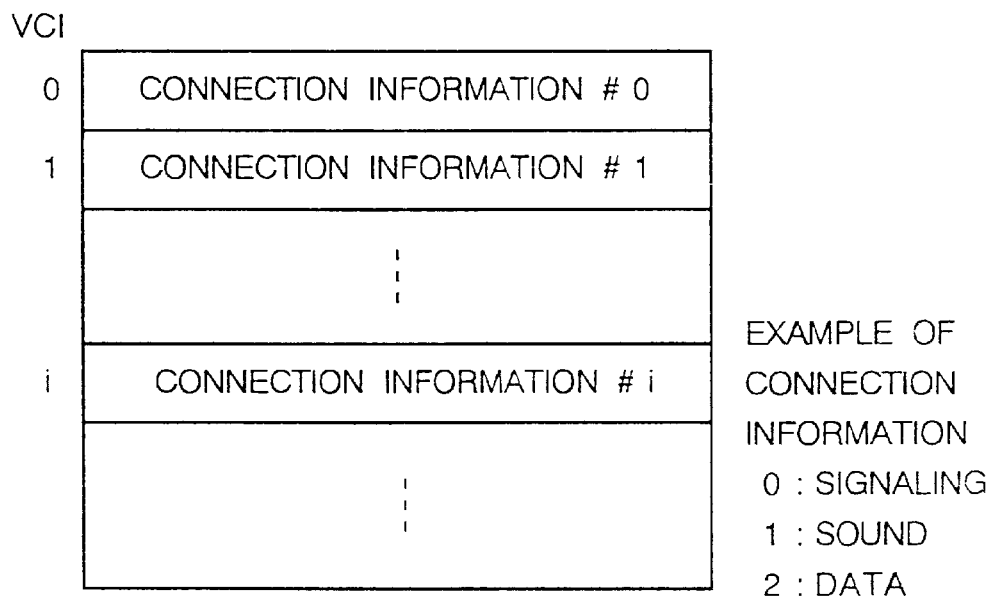
FIG. 3 shows one example of a structure of a VCI analysis table indicated in the flowchart of FIG. 2.
Figure 4:
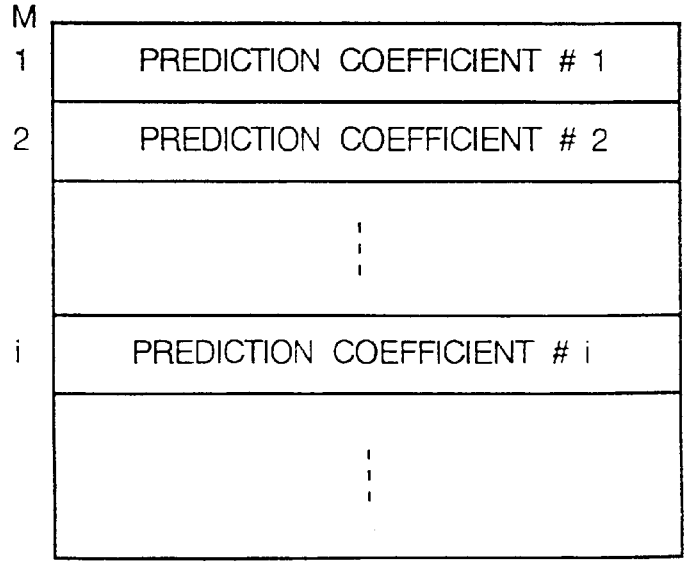
FIG. 4 shows one example of a structure of a prediction coefficient table indicated in the flowchart of FIG. 2.

FIG. 2 is a flowchart showing the operation of rate calculation circuit A 101 shown in FIG. 1. FIG. 3 shows an example of the VCI analysis table shown in the flowchart of FIG. 2. FIG. 4 shows an example of the structure of the prediction coefficient table shown in the flowchart of FIG. 2.

Figure 5:
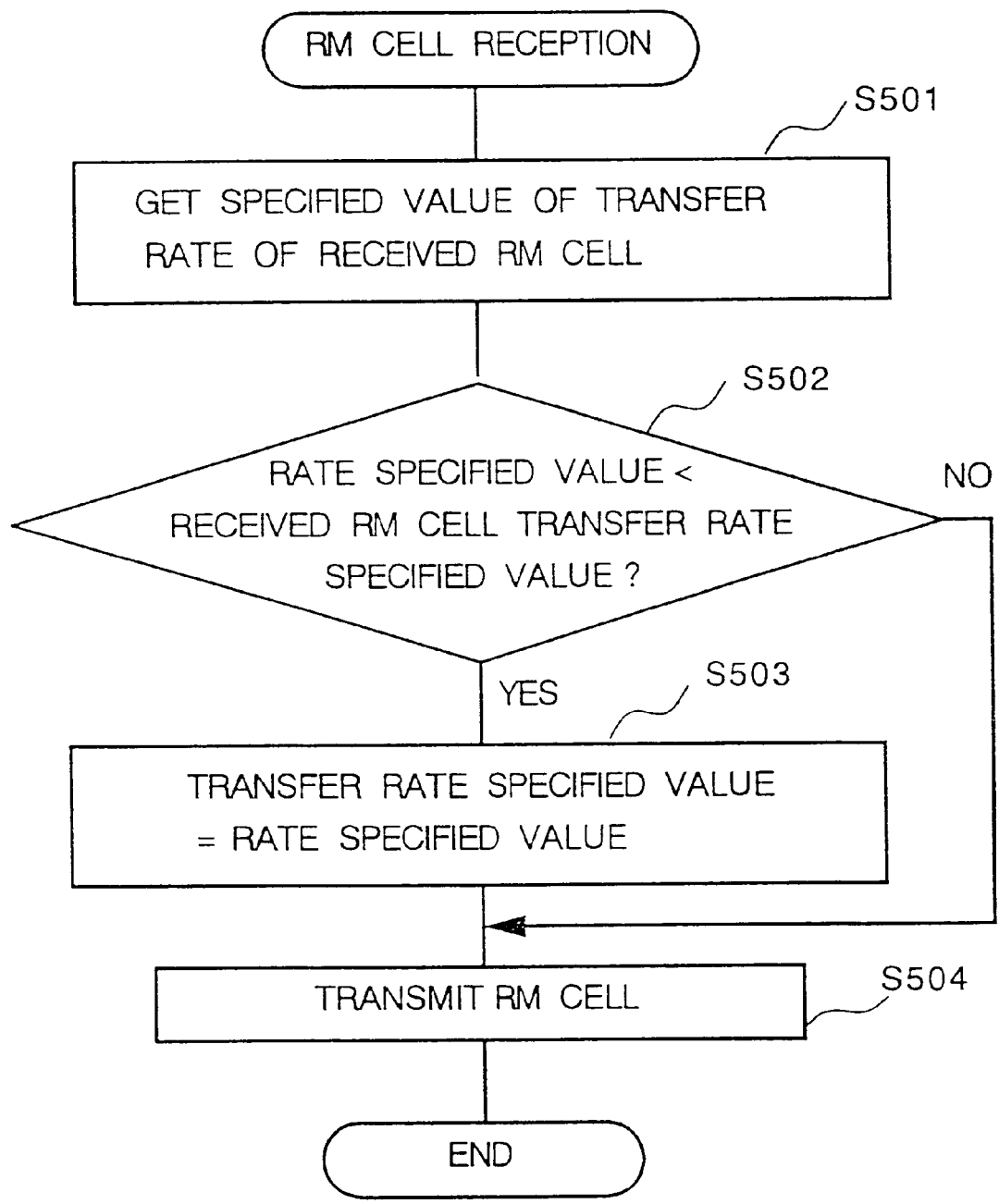
FIG. 5 outlines an operation flowchart of the RM cell processing circuit A shown in FIG. 1.

FIG. 5 is a flowchart showing the operation of the RM cell processing circuit A shown in FIG. 1.

Figure 34:
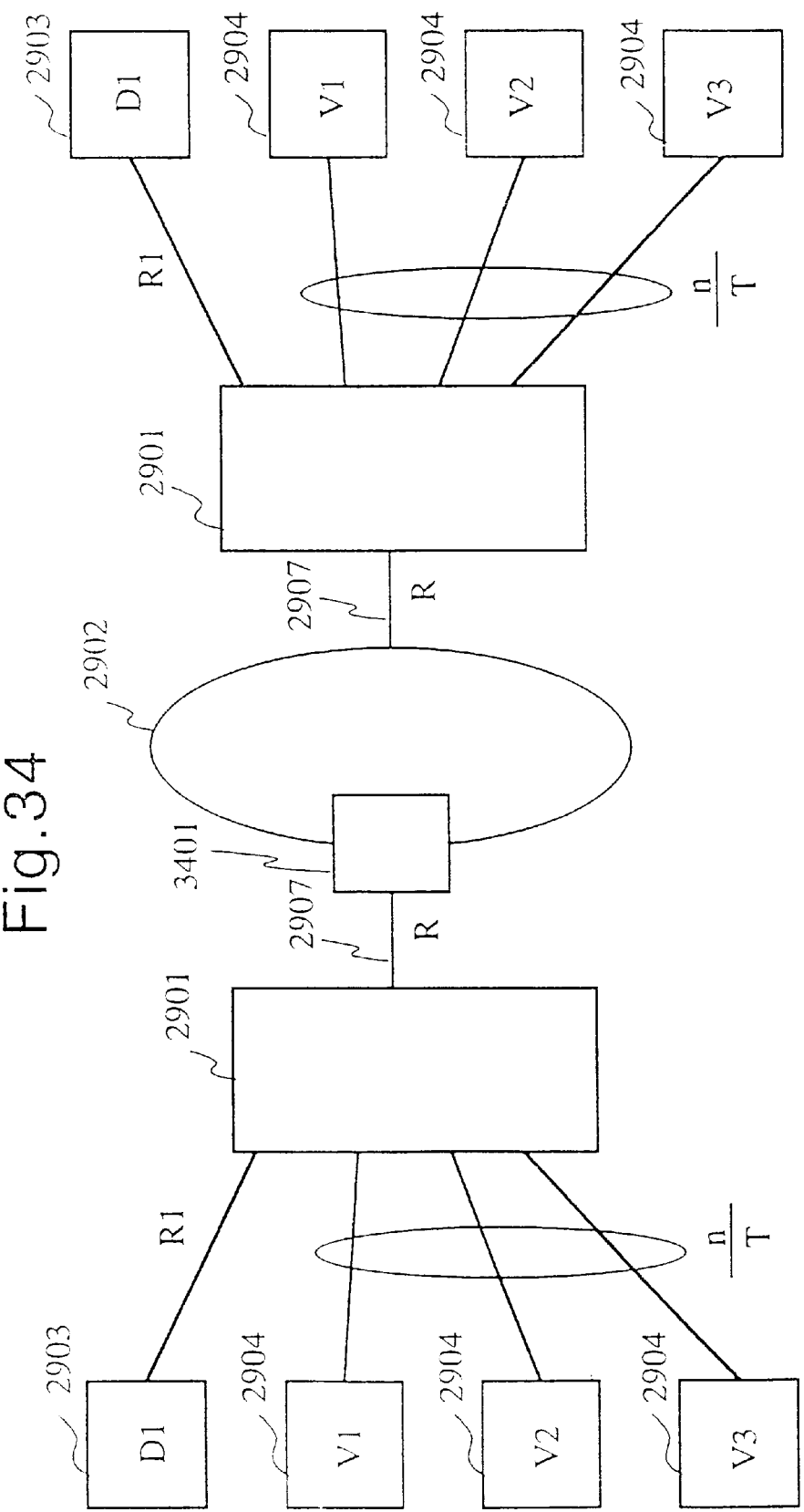
FIG. 34 shows an example of a configuration of the sound/data integrated network of the present invention.

FIG. 34 shows an example of the configuration of the sound and data integrated network of this embodiment.

In FIG. 34, D1 is a data ATM terminal. VI through V3 are sound ATM terminals. In FIG. 34, therefore, the number of sound connections is three while the number of data connections is one.

Figure 35:
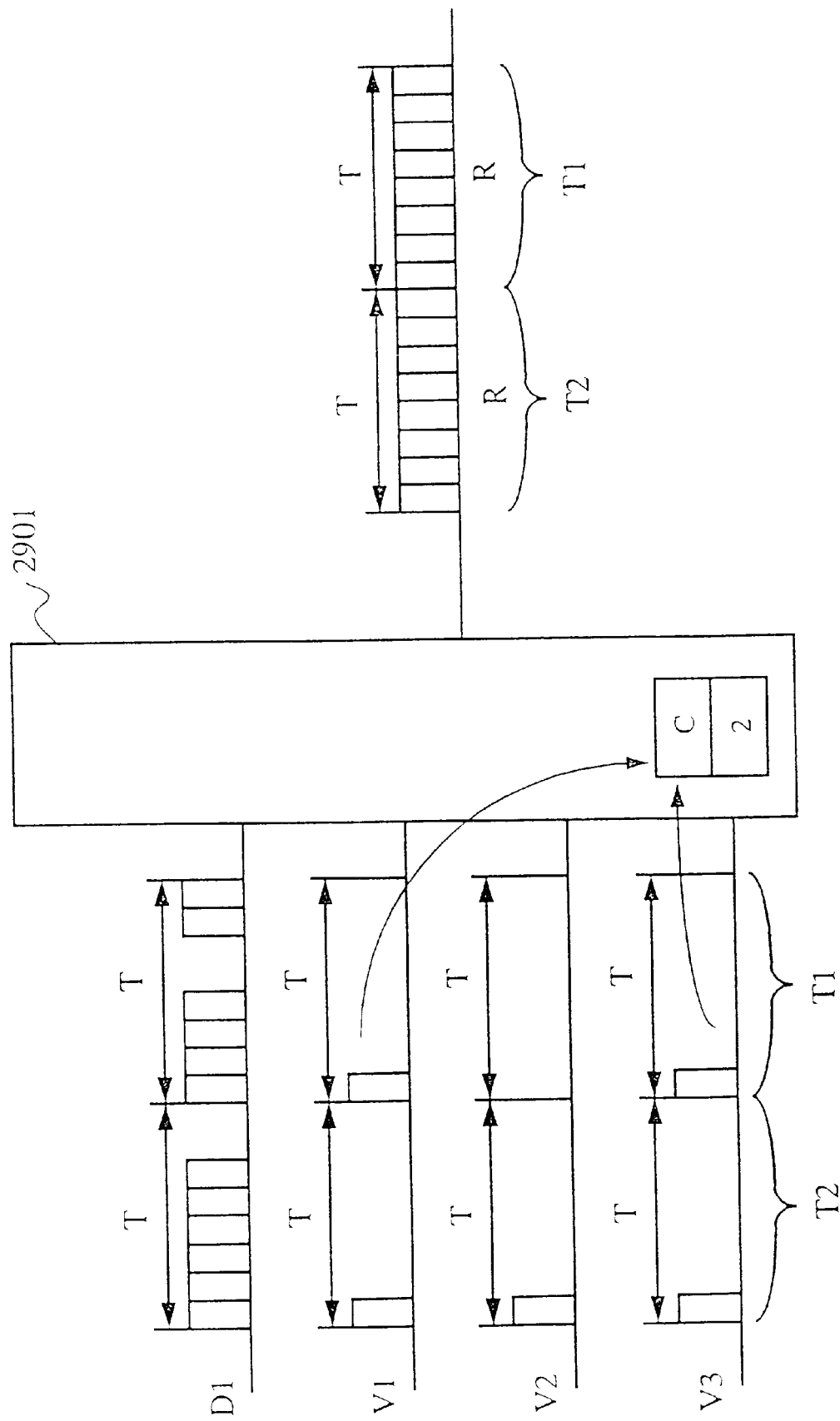
FIG. 35 depicts an operation of the present invention.

FIG. 35 depicts the operation.

Figure 28:
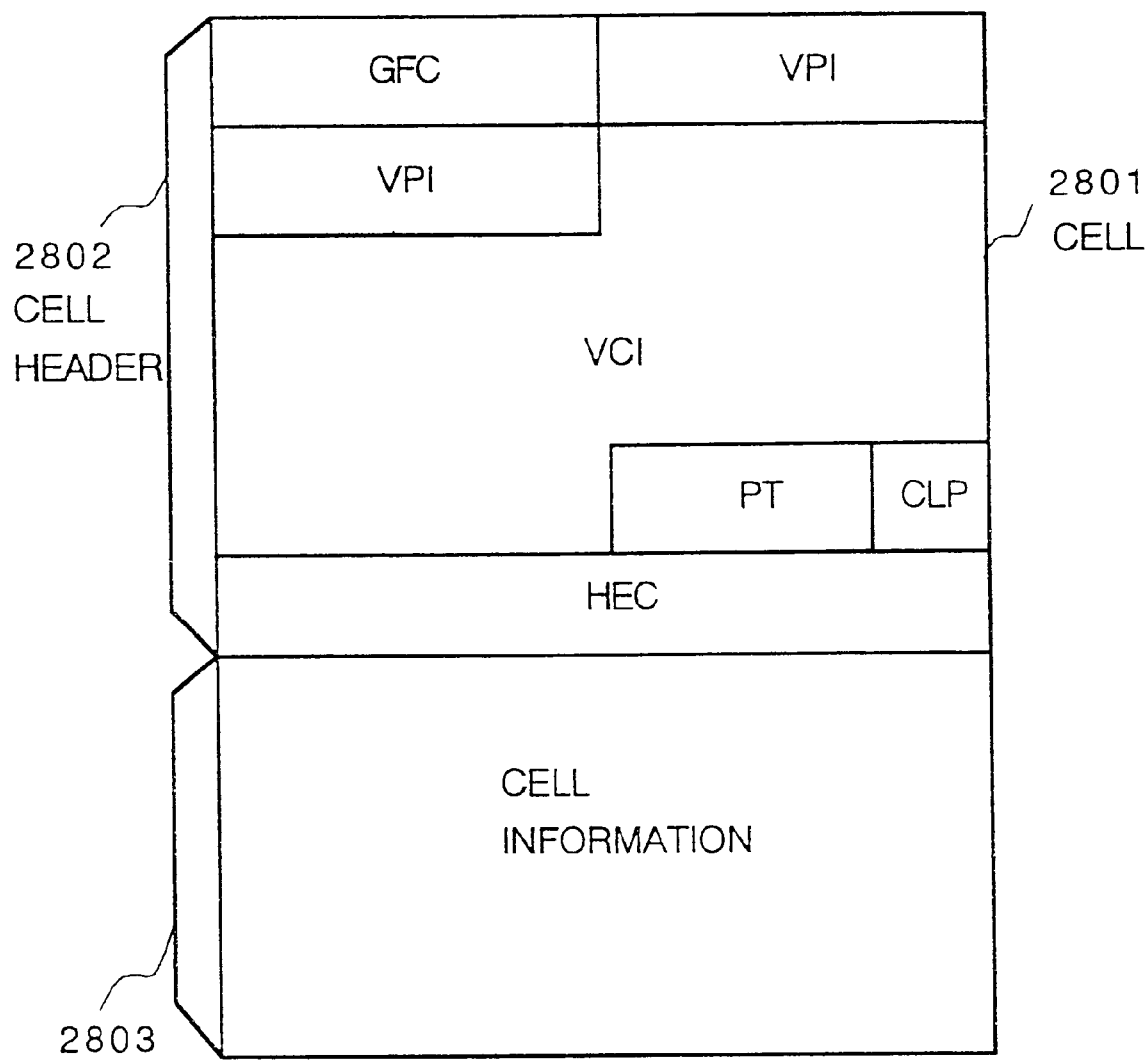
FIG. 28 shows a structure of an ATM cell of the present and conventional inventions.
Figure 29:
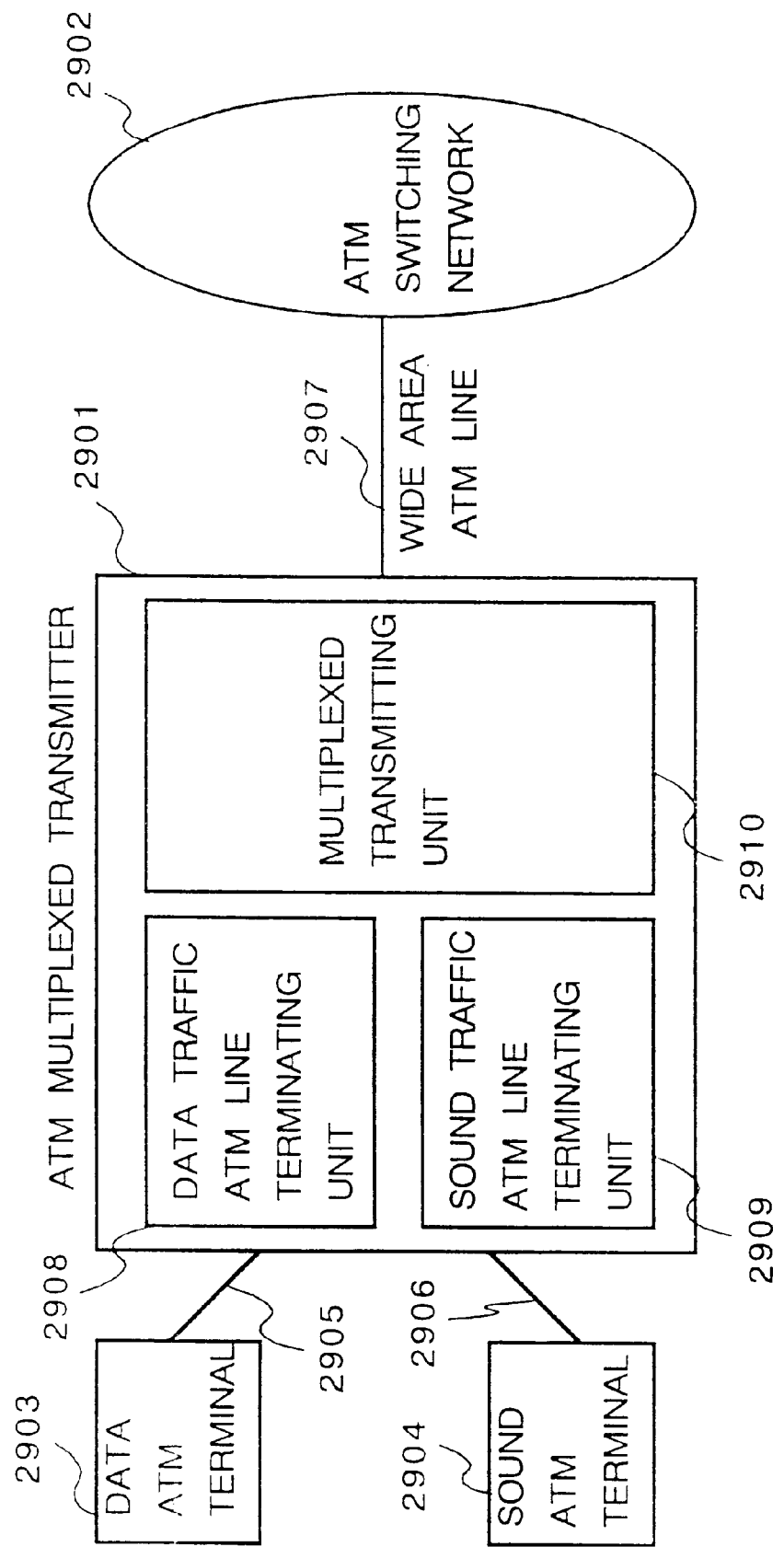
FIG. 29 shows an example of a configuration of sound/data integrated network of the present and conventional invention.
Figure 33:
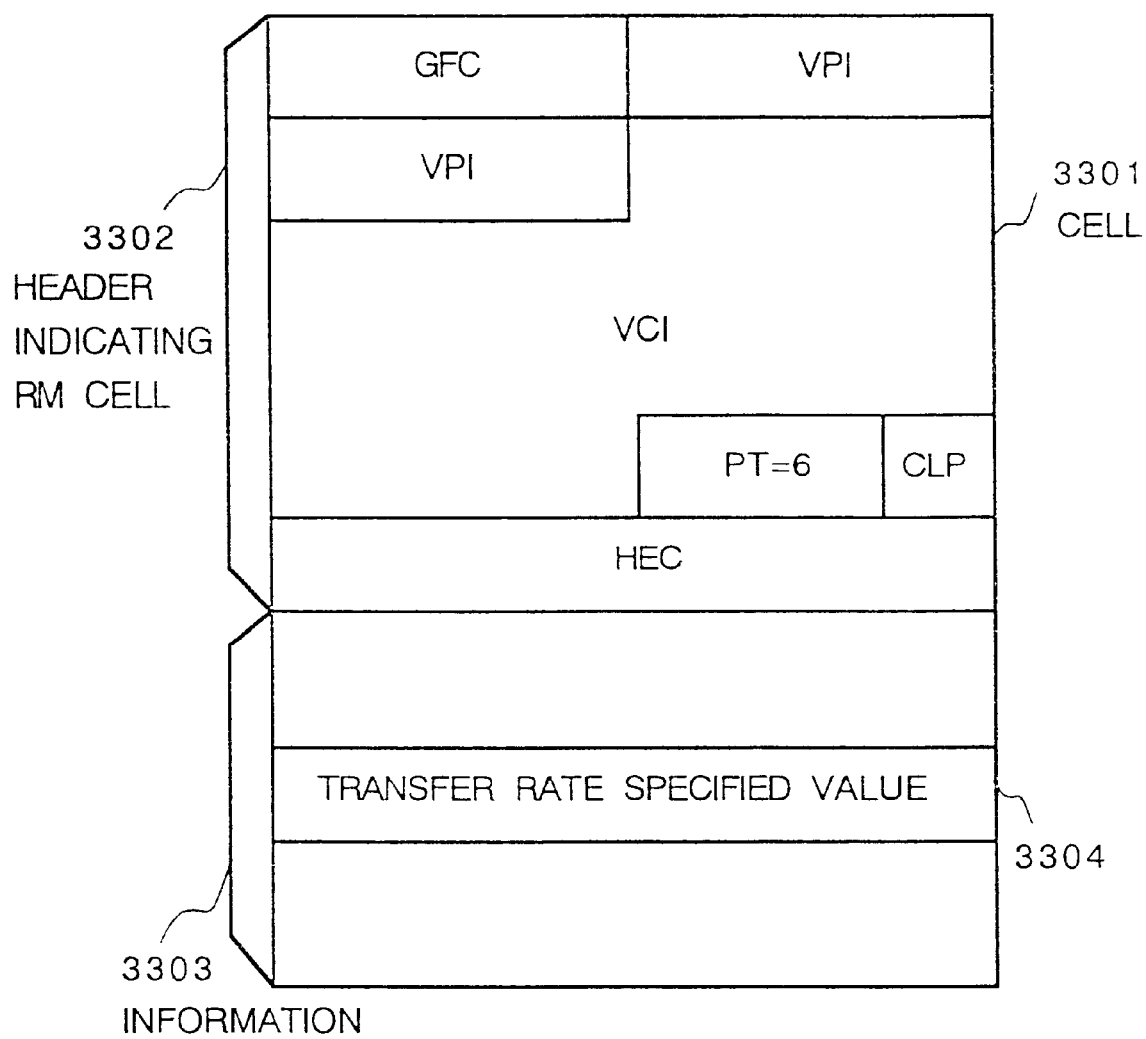
FIG. 33 shows a structure of an RM cell format for adjusting the transmission rate by the data terminal of the present and conventional inventions.

FIGS. 28, 29 and 33 are also used for explaining the present invention.

With reference to figures, the traffic controlling system of the present invention will be set forth below.

A cell received by data traffic ATM line terminating unit 2908 or sound traffic ATM line terminating unit 2909 is stored in transmitting buffer 102 and input into rate calculation circuit A 101. Using the VCI in cell header 2802 of the cell format shown in FIG. 28, the rate calculation circuit A 101 searches the VCI analysis table shown in FIG. 3 for the cell received from the terminal to obtain the connection information (step S201), and determines whether or not it is sound information (step S202). If it turns out to be sound information, counter C inside the rate calculation circuit A 101 is incremented (step S203).

FIG. 35 shows that three sound ATM terminals 2904 output two sound cells during sound cell forming cycle T1, in which sound is transformed into a cell, and output three sound cells during sound cell forming cycle T2. The counter C indicates the volume 2 after sound cell forming cycle T1.

Rate calculation circuit A 101 has a circuit which is activated at a fixed cycle (sound cell forming cycle T). The circuit obtains a prediction coefficient (step S204) by searching the prediction coefficient table shown in FIG. 4, based on a number of sound cell simultaneous connections, which is a preset value, (i.e., the number of paired sound ATM terminals to be connected simultaneously for sound connection, and denoted by M. In FIG. 34, M is three.). Then, the obtained prediction coefficient is multiplied by the counter value to obtain an estimated number of the sound cells (hereinafter, n) to be arriving at the next cycle (step S205).

Then, as shown in the expression below, by subtracting the transmission cell speed (or transmission rate) n/T (cells/sec.) for sound cells from the maximum transmission cell speed R (cells/sec.) for wide area ATM line 2907 including the transmission cell speed for both the sound cells and data cells, the data cell transmission cell speed is calculated, and designated as the specified rate (the value is called as the rate output value R1 or simply rate specified value). Based on the specified rate, the output to RM cell processing circuit A 103 is updated and the counter is reset (step S206, step S207).

$$\text{Rate output value R1 (cells/sec.)} = R - n/T$$

(where, R is the maximum transmission cell speed of wide area ATM line 2907.)

If the prediction coefficient is assumed to be one, then, $$n = \text{counter value} \times \text{prediction coefficient} = 2 \times 1 = 2, \text{ in FIG. 35.}$$

Furthermore, if T is assumed to be one second, and R equals eight cells/sec., then, Rate output value R1=R−n/T=8−2/1=6, whereby the rate output value R1 becomes six cells per second. Rate output value R1 indicates the unused line capacity of wide area ATM line 2907. When the prediction coefficient is one, it is regarded that the number of sound cells having arrived at the current cycle will be the number of sound cells to be arriving at the next cycle.

RM cell processing circuit A 103 operates separately from rate calculation circuit A 101 except when referring to the output of the specified rate. Receiving circuit A 104 analyzes the type of cell header 2802 shown in FIG. 28 in order to judge whether an ATM cell received from wide area ATM line 2907 is an RM cell or not. If the PT (Payload Type: used to indicate the information type) value for cell header 2802 of FIG. 28 is six, as shown in FIG. 33, receiving circuit A 104 determines that the ATM cell is an RM cell, and inputs into RM cell processing circuit A 103. Otherwise, the ATM cell is stored in receiving buffer 105. The ATM cell stored in receiving buffer 105 is transferred to data traffic ATM line terminating unit 2908 or sound traffic ATM line terminating unit 2909 later.

The operation of RM cell processing circuit A 103 is explained below using the flowchart of FIG. 5.

The RM cell processing circuit A 103 gets transfer rate specified value 3304 of the RM cell upon its reception (step S501). If the rate specified value indicated by rate calculation circuit A 101 is smaller than transfer rate specified value 3304 of the RM cell (step S502), the transfer rate specified value is replaced with the rate specified value (step S503). If not, the rate specified value indicated by rate calculation circuit A 101 is directly transferred to receiving buffer 105 and transmitted to data traffic ATM line terminating unit 2908 as other cells (step S504). Data ATM terminal receives the RM cell, and changes the transmission rate to transfer rate specified value 3304 of the RM cell. Because the number of data connections is made one as indicated in FIG. 34, the transfer rate specified value is set as transfer rate specified value 3304 of the RM cells in this embodiment. If the number of data connections is two or more, the rate specified value indicated by rate calculation circuit A 101 divided by the number of data connections, or proportionally distributed by the transmission cell speed of the data connection, is set as the transfer rate specified value 3304 of the RM cell.

In this embodiment, rate calculation circuit A 101 predicts the number of sound cells to be arriving at the next cycle based on the result of observing the number of sound cells of a plurality of sound connections having arrived from the sound ATM terminal via sound traffic ATM line terminating unit 2909. The nodes, such as the ATM multiplexed transmitter and the ATM switched network, obtain the transferable transmission rate based on the predicted value. RM cell processing circuit A 103 sets the transferable transmission rate at the time of relaying the data traffic controlling cell (RM cell), and notifies the data ATM terminal of the transferable transmission rate via data traffic ATM line terminating unit 2908. The transmission rate of the data ATM terminal can be thus adjusted in accordance with the using condition of the line for sound connection.

The ATM traffic controlling apparatus predicts the unused line capacity based on the arrival condition of the sound cells, and controls the transmission rate depending on the predicted unused line capacity. This embodiment enables multiplexed transmission with improved cell disposal rate.

Embodiment 2.

Figure 6:
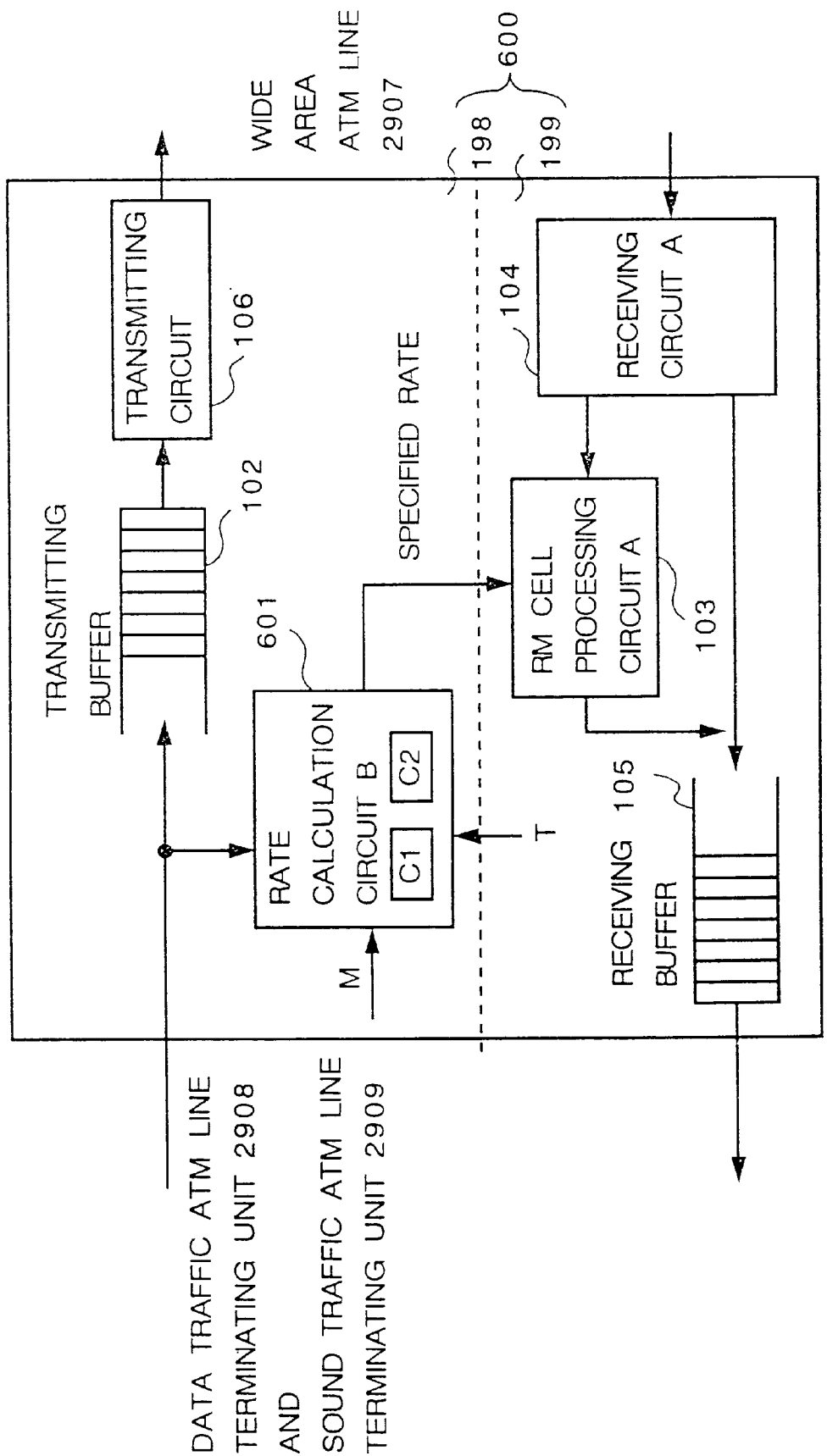
FIG. 6 shows a configuration of another embodiment of the ATM traffic controlling apparatus of the present invention.

FIG. 6 shows the configuration of another embodiment of the ATM traffic controlling apparatus of the present invention.

In FIG. 6, signs the same as those of FIG. 1 indicate the same or corresponding components. 601 denotes a rate calculation circuit B. This embodiment differs from embodiment 1 in its operation of the rate calculation circuit.

Figure 7:
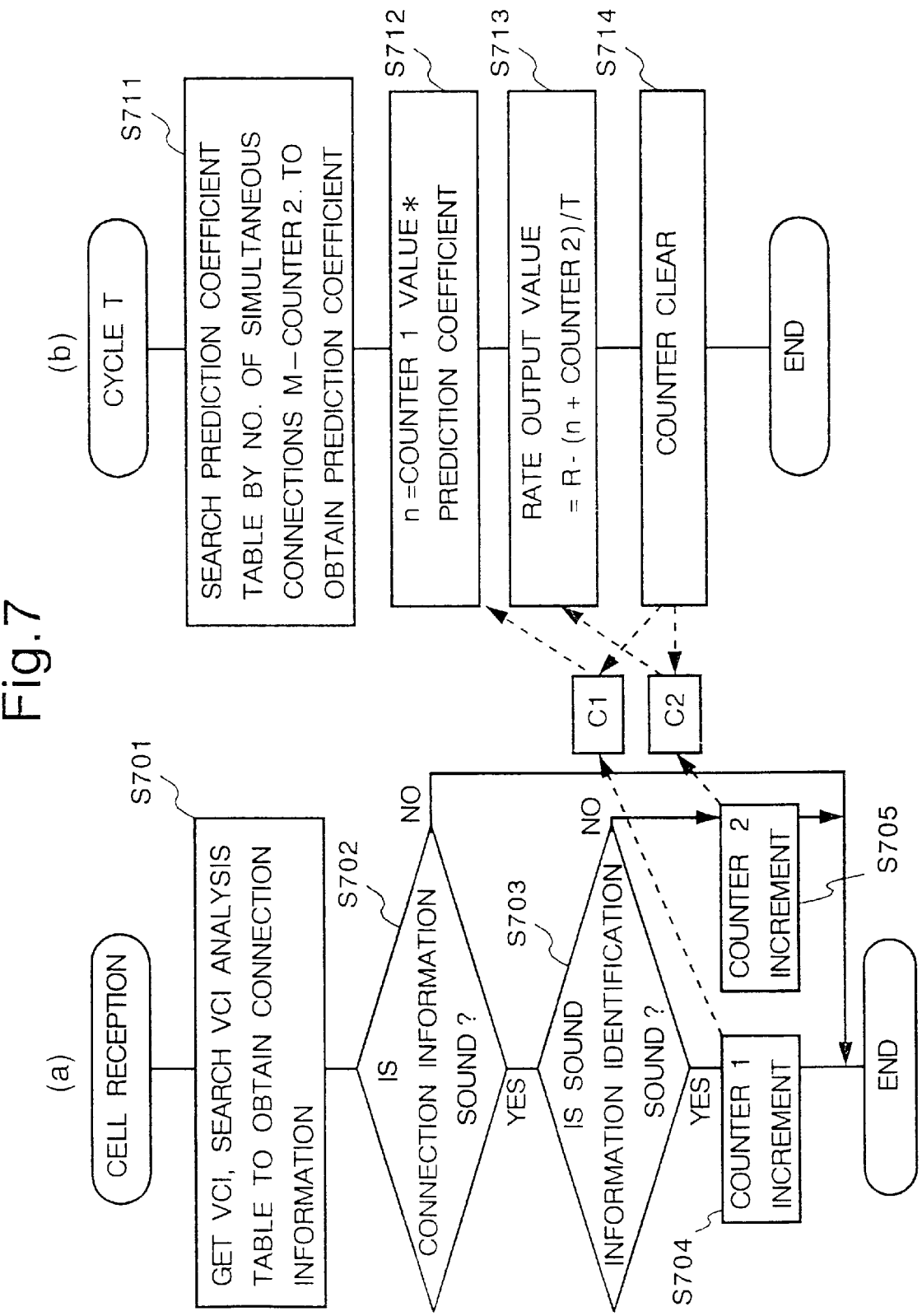
FIG. 7 outlines an operation flowchart of rate calculation circuit B 601 indicated in FIG. 6.

FIG. 7 is an operation flowchart of rate calculation circuit B 601 shown in FIG. 6.

Figure 8:
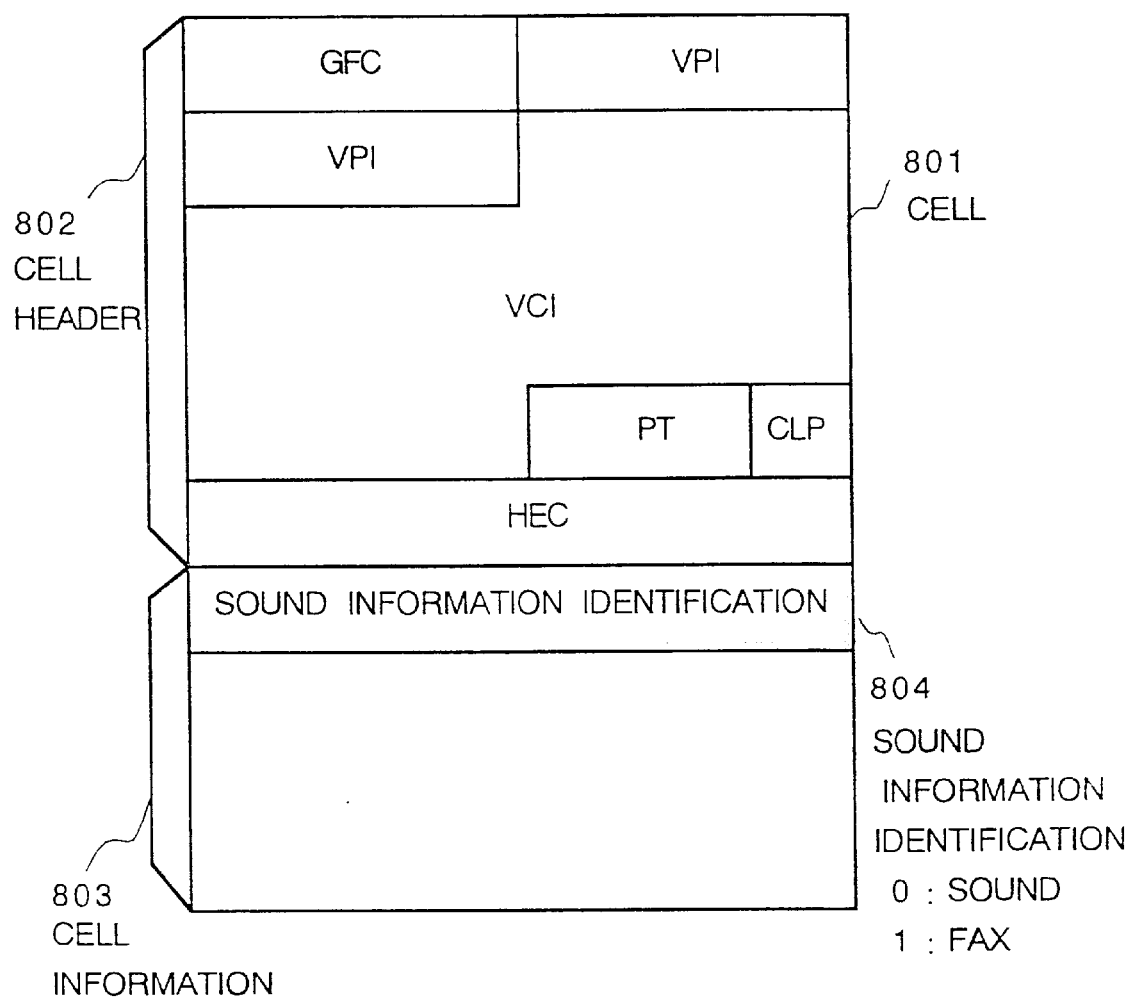
FIG. 8 shows one example of a structure of a sound cell format indicated in the flowchart shown in FIG. 7.

FIG. 8 shows one example of the configuration of a sound cell format used for the flowchart of FIG. 7.

In FIG. 8, a cell 801, a cell header 802, cell information 803, sound information identification 804, kept in cell information 803, for identifying whether a cell is a sound cell or a FAX cell (a FAX cell is one type of sound cell) are shown.

Figure 36:
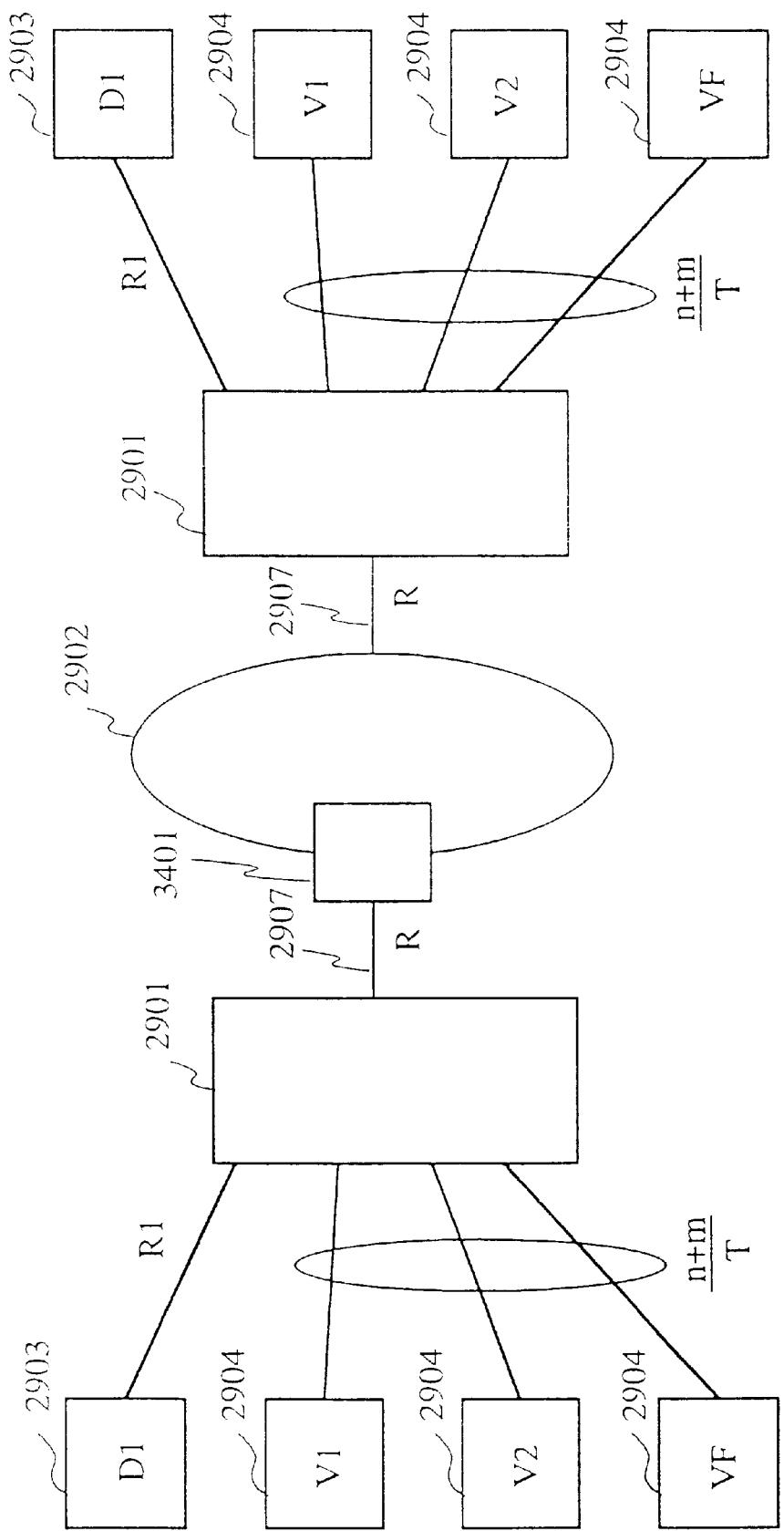
FIG. 36 shows an example of a configuration of sound/data integrated network of the present invention.

FIG. 36 shows the sound ATM terminal VF which converts facsimile data into sound band information before transferring. The sound ATM terminal VF always generates one FAX cell for each sound cell forming cycle T during sound connection, as shown in FIG. 37. V1 and V2 are the sound ATM terminals for transferring sound information. The sound ATM terminals V1 and V2 generate a maximum of one sound cell in each sound cell forming cycle T and transmit.

FIGS. 28, 29 and 33 are used for the explanation of the present invention.

The operation of rate calculation circuit B 601 is explained below using FIGS. 7 and 8.

Upon receiving a cell from the terminal, rate calculation circuit B 601 searches the VCI analysis table shown in FIG. 3 using the VCI in the cell header 2802 of the cell format shown in FIG. 28, and obtains the connection information (step S701). Rate calculation circuit B 601 determines if the received cell is a sound cell or not based on the connection information (step S702). When the cell has turned out to be a sound cell, it is further determined whether it is a sound information (sound cell) or a sound band information (FAX cell) (step S703) by the identification information unit of the sound cell format shown in FIG. 8. If the cell has turned out to be a sound information (sound cell), counter 1 C1 is incremented (step S704). For the sound band information (FAX cell), counter 2 C2 is incremented (step S705).

Figure 30:
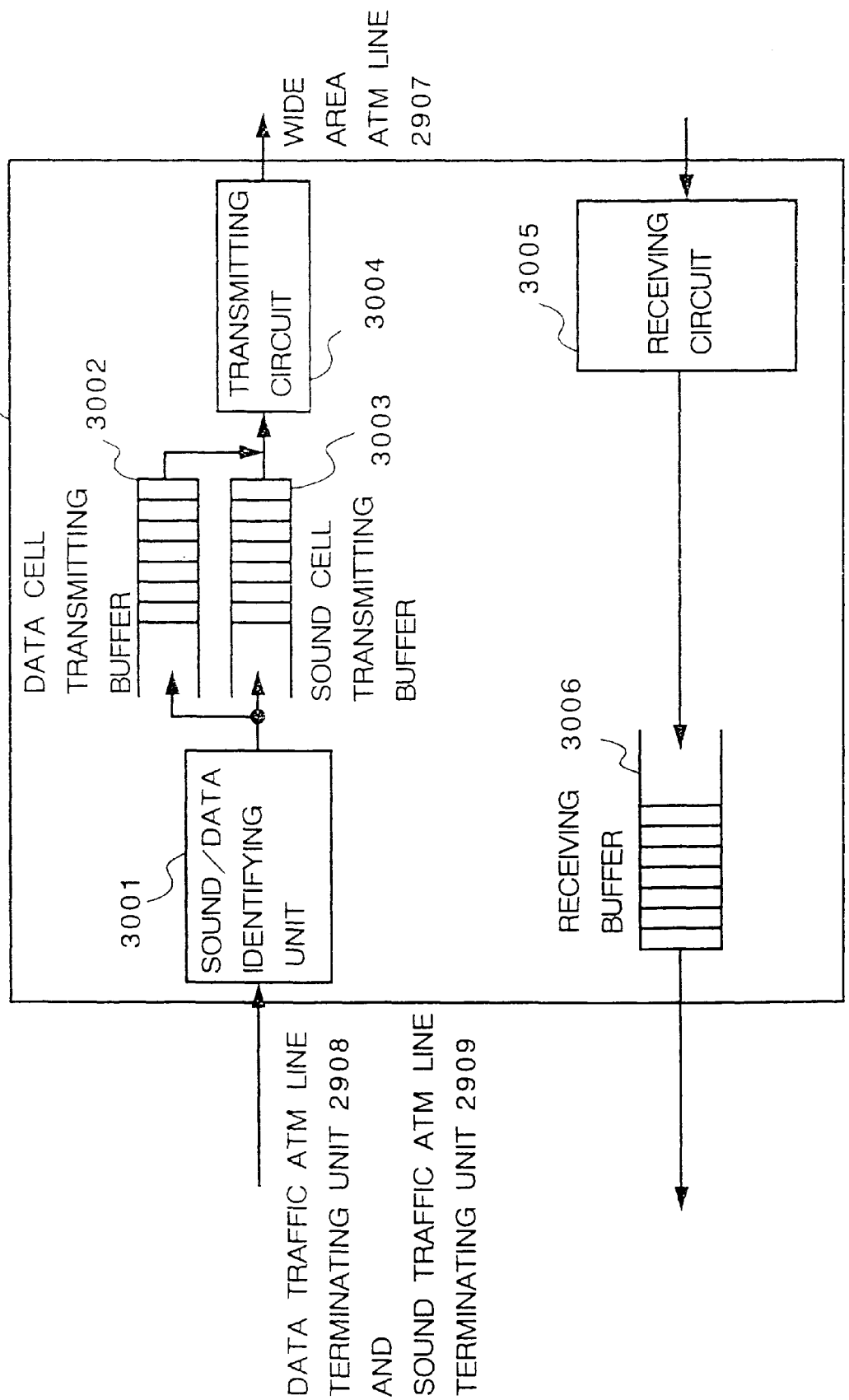
FIG. 30 shows a configuration of the conventional multiplexed transmitter 2910.

The rate calculation circuit B 601 has a circuit activated at a fixed cycle (T). Based on the number of sound cell simultaneous connections M (M=3−1=2), which is obtained by subtracting counter 2 value m (the number of connections for FAX cells. m is one in FIG. 30.) from the number of simultaneous connections M, which is a preset value, for sound connections, (the number of connections for sound connection including both sound cells and FAX cells. M is three in FIG. 36), the circuit obtains the prediction coefficient by searching the prediction coefficient table shown in FIG. 4 (step S711), and multiplies the prediction coefficient by the number of cells having arrived, which is indicated as the counter 1 value, and obtains the estimation value n for the number of sound cells to be arriving at the next cycle (step S712). The value m of counter 2 is subtracted in order to estimate the arrival of only sound cells for the next cycle. Then, the specified rate of the data cell is calculated by the expression below, and the output to RM cell processing circuit A 103 is updated based on the calculated specified rate as the rate output value R1 (step S713), and counter 1 C1 and counter 2 C2 are reset (step S714).

Rate output value $R=R-(n+m)/T$ (where, m indicates the value of counter 2 C2.).

The reason why the value m of counter 2 is added to the estimation value n is because the FAX cell is always transferred in each cycle during connection.

The ATM traffic controlling apparatus identifies the information content of the sound cell data and makes a prediction considering the traffic characteristics of sound band data (the characteristics that the FAX cell is always transferred at each cycle). The embodiment therefore realizes a multiplexed transmission with improved cell disposal rate without restricting the use of a sound connection.

Embodiment 3.

Figure 9:
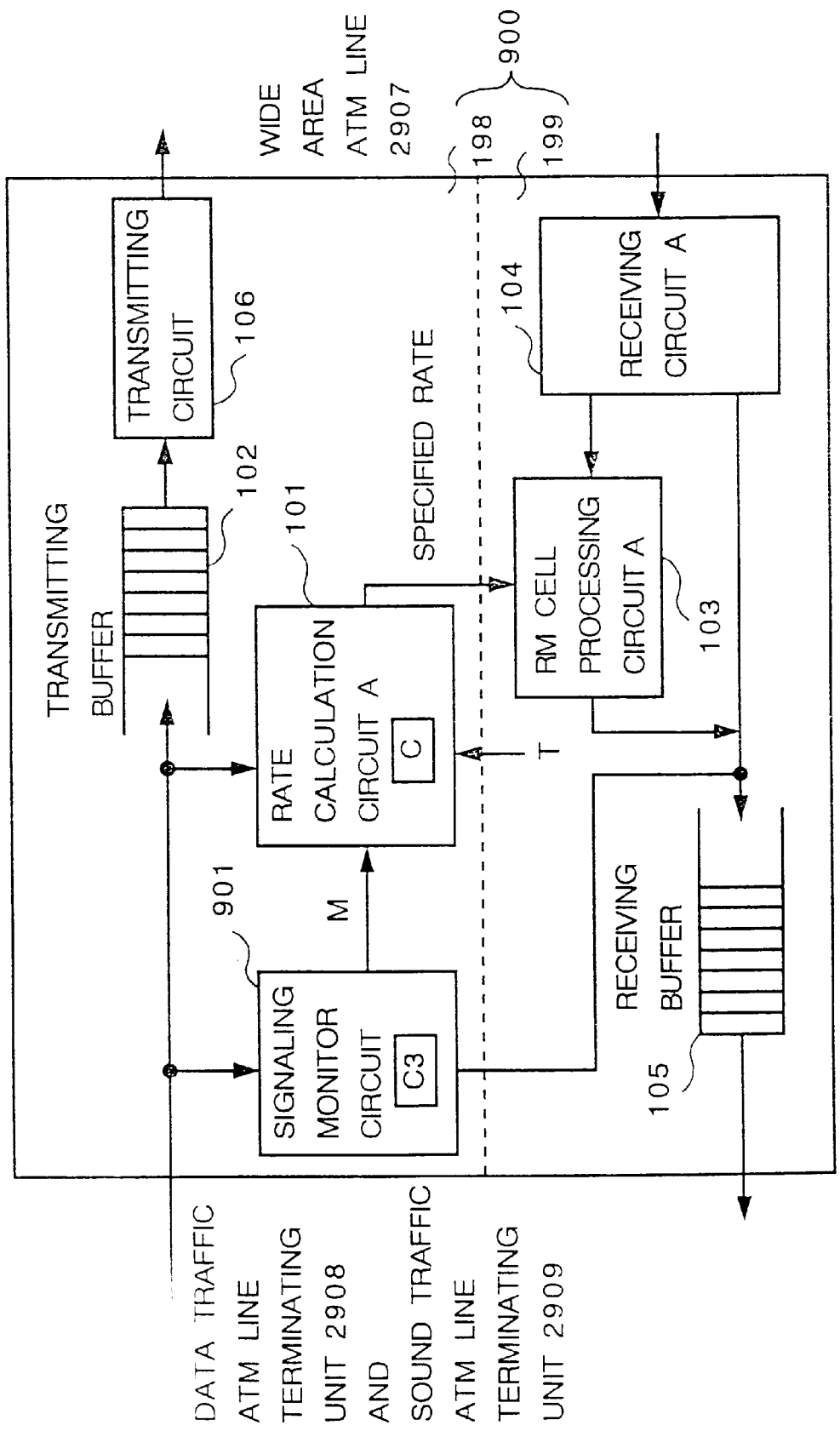
FIG. 9 shows a configuration of another embodiment of the ATM traffic controlling apparatus of the present invention.

FIG. 9 shows the configuration of another embodiment of the ATM traffic controlling apparatus of the present invention.

In the figure, signs the same as those of FIG. 1 indicate the same or corresponding components. 901 denotes a signaling monitor circuit. This embodiment differs from embodiment 1 and embodiment 2 in that the number of simultaneous connections M, which was the preset value, is automatically obtained by signaling monitor circuit 901.

In FIG. 9, a cell received from data traffic ATM line terminating unit 2908 or sound traffic ATM line terminating unit 2909, and from wide area ATM line 2907, is input into signaling monitor circuit 901. The number of simultaneous connections M calculated by signaling monitor circuit 901 is input into rate calculation circuit A101.

Figure 10:
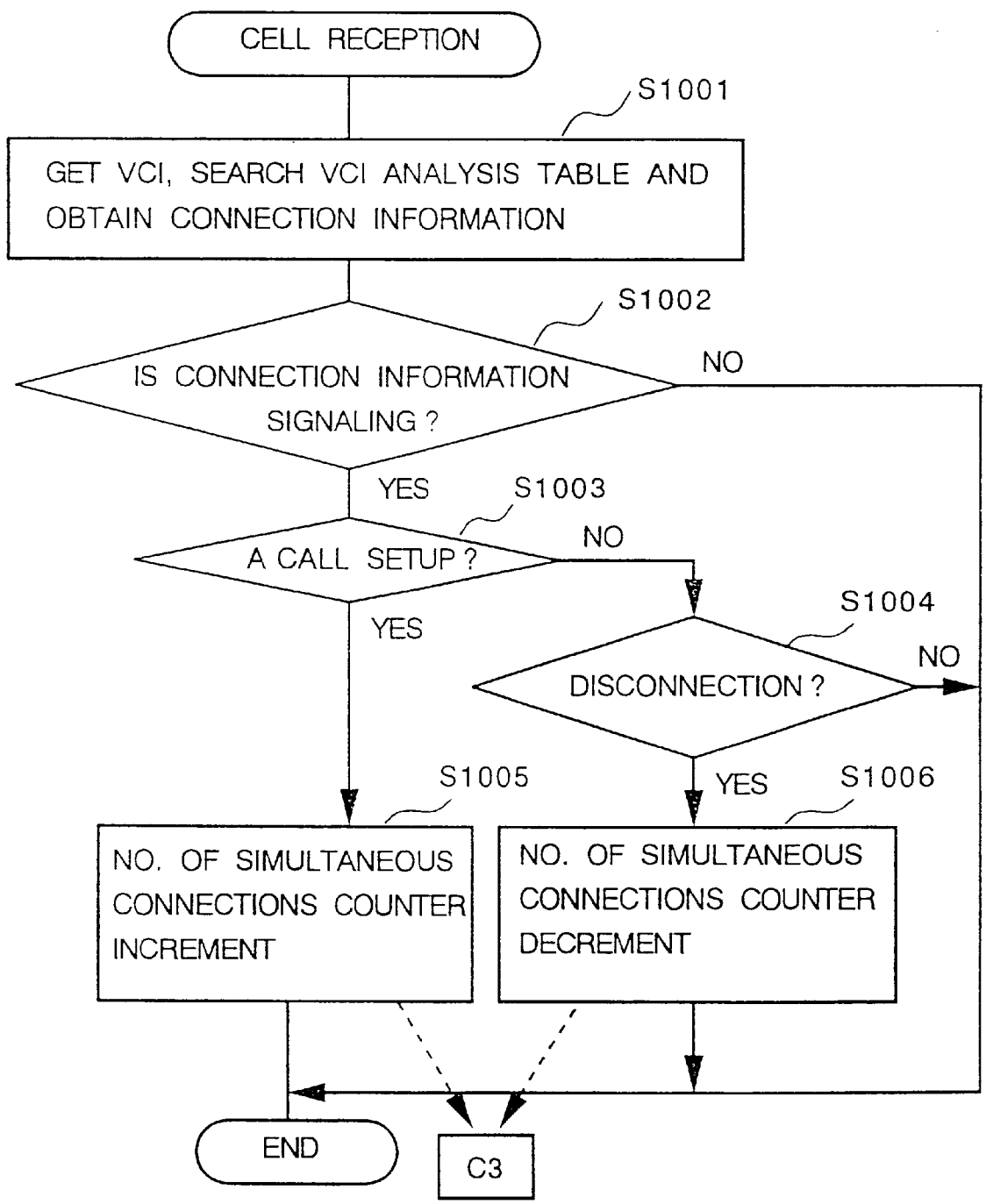
FIG. 10 outlines an operation flowchart of a signaling monitor circuit shown in FIG. 9.

FIG. 10 is an operation flowchart of the signaling monitor circuit shown in FIG. 9.

FIGS. 28, 29, and 33 are used for the explanation of the operation of this invention.

The operation of signaling monitor circuit shown in FIG. 9 is explained below using the flowchart of FIG. 10.

Signaling monitor circuit 901 gets the VCI in cell header 2802 shown in FIG. 28 of a cell received from data traffic ATM line terminating unit 2908 or sound traffic ATM line terminating unit 2909, and wide area ATM line 2907, and searches the VCI analysis table to obtain the connection information (step S1001). Then the signaling monitor circuit 901 determines whether the connection information is a signaling information or not because the connection information is a specific value (step S1002). When the connection information is a signaling information, the information in the VCI is checked to determine whether or not it is a call setup or not(step S1003). When it is a call setup, the number of the simultaneous connections counter C3 is incremented. For disconnection, the number of the simultaneous connections counter C3 is decremented, and the input value to rate calculation circuit A101 is updated.

The ATM traffic controlling apparatus detects the number of sound connections, and predicts the traffic based on the number of sound connections. This embodiment therefore achieves an efficient multiplexed transmission in accordance with the change of the number of sound connections.

Embodiment 4.

Figure 11:
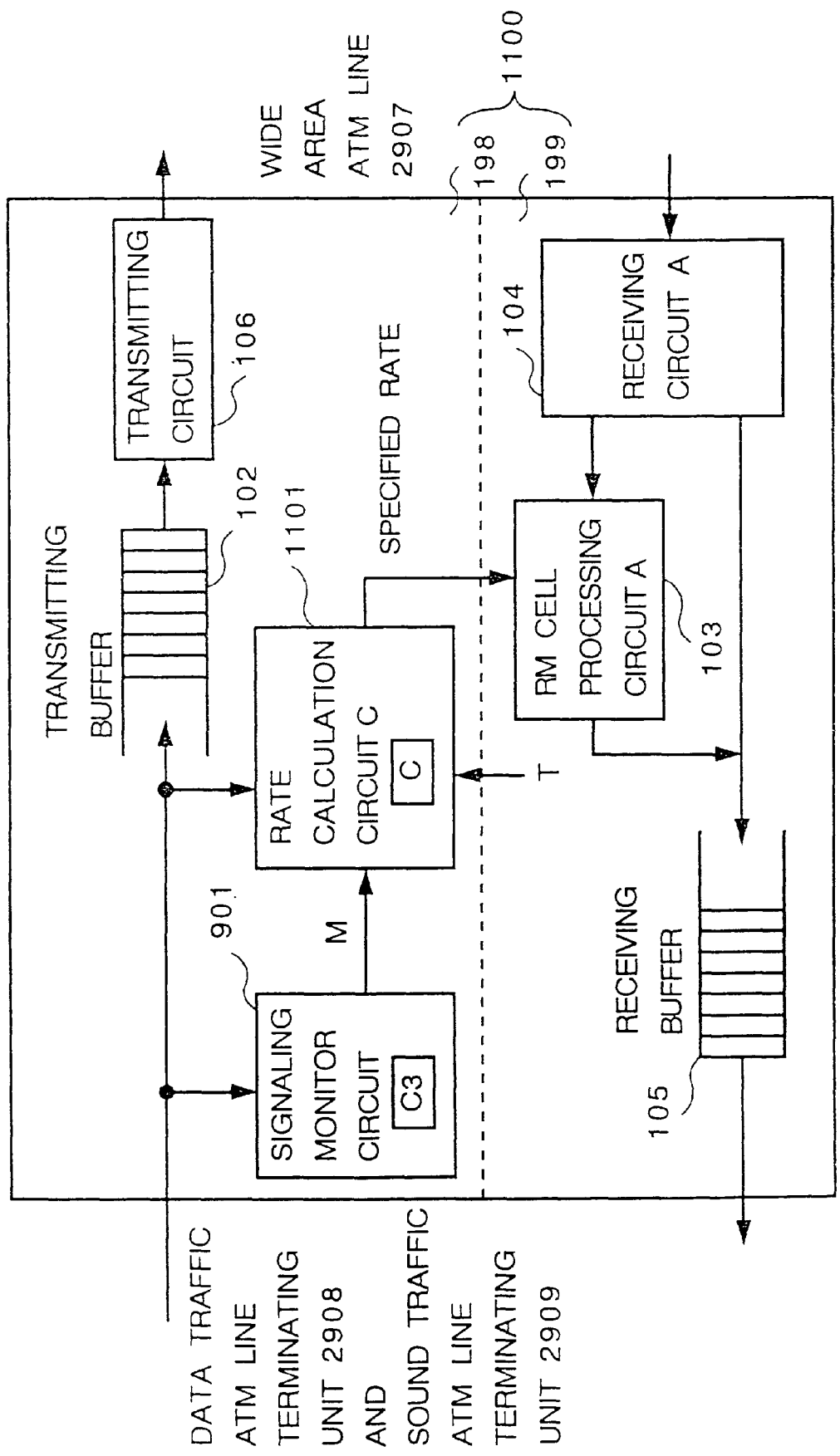
FIG. 11 shows a configuration of another embodiment of the ATM traffic controlling apparatus of the present invention.

FIG. 11 shows the configuration of another embodiment of the ATM traffic controlling apparatus of the present invention.

In the figure, signs the same as those of FIG. 9 indicate the same or corresponding components. A multiplexed transmitter 1100 which is the ATM traffic controlling apparatus, and a rate calculation circuit C 1101 are shown. In this embodiment, the operation of the rate calculation circuit A differs from embodiment 3 in that the rate is calculated based on the value determined by the number of simultaneous connections and not the counter value for the cell number, when the number of simultaneous connections exceeds a certain value.

Figure 12:
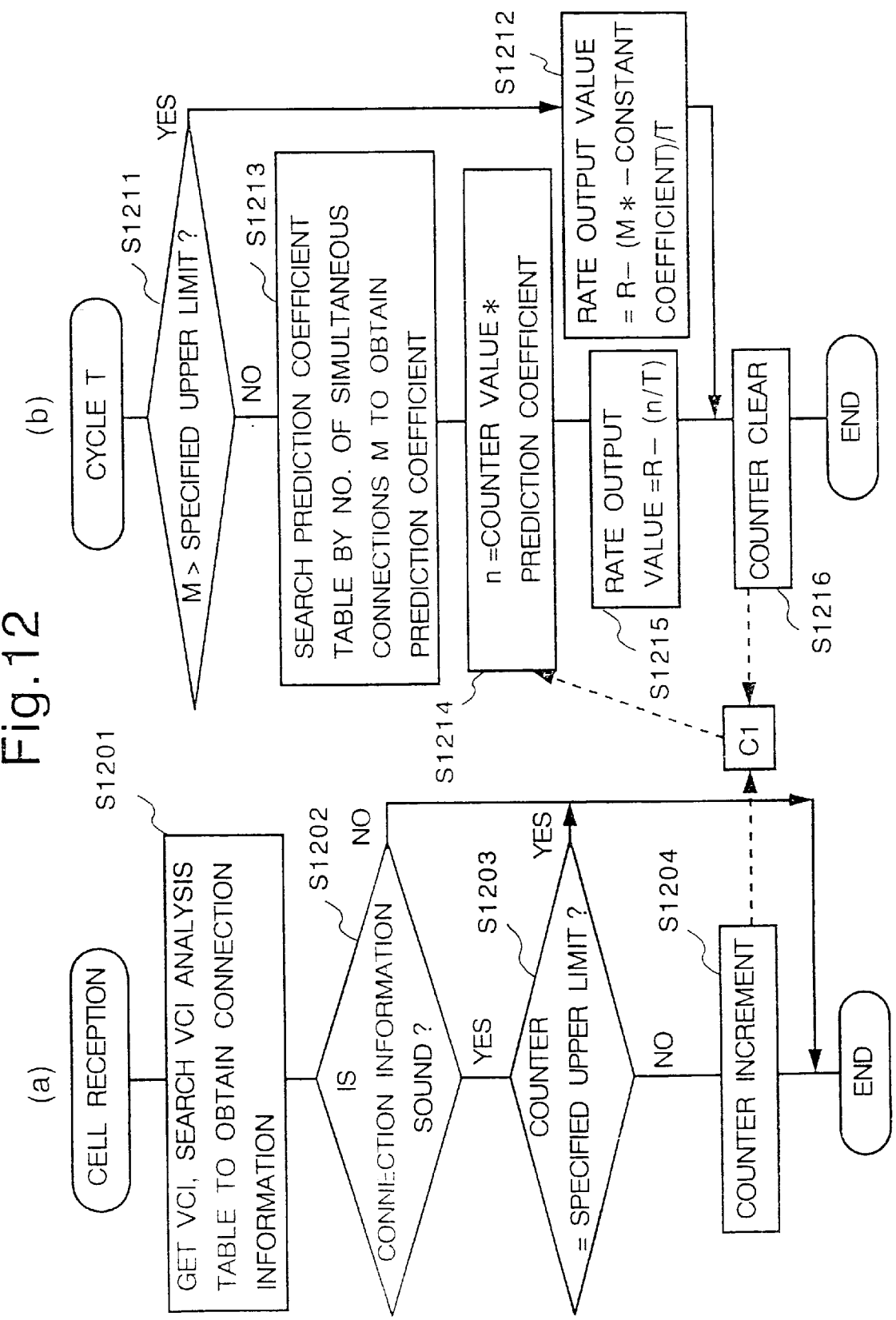
FIG. 12 is an operation flowchart of the rate calculation circuit C shown in FIG. 11.

FIGS. 12 is an operation flowchart of rate calculation circuit C 1101 shown in FIG. 11.

FIGS. 28, 29 and 33 are used for the explanation of the present invention.

The operation of rate calculation circuit C 1101 shown in FIG. 11 is now explained using the flowchart of FIG. 12.

Similarly to Embodiment 3, when rate calculation circuit C 1101 receives a cell from the terminal, it searches the VCI analysis table shown in FIG. 3 using the VCI in the cell header shown in FIG. 28 (step S1201) to determine whether or not the connection information is sound information (step S1202).

When the connection information is sound information, the counter is checked whether its value exceeds the set upper limit (for example 10) (step S1203). When the counter value does not exceed the set upper limit (10), counter C is incremented (step S1204). If the counter value has already reached the set value (10), the counter is not updated. Then, the number of simultaneous connections M input from signaling monitor circuit 901 at each cycle T is judged whether it exceeds the set value (10) (step S1211), and if it exceeds the set value, the rate output value of the data call based on the number of simultaneous connections M is obtained by the following expression (step S1212).

$$\text{Rate output value } R1 = R - (M * \text{constant coefficient})/T$$

When the number of simultaneous connections M is a large value (for instance 10 or more), the rate at which the sound cells will be transferred can be statistically calculated. For example, if 80 percent of sound ATM terminals generate sound cells, the constant coefficient can be set to 0.8. When the number of simultaneous connections M is small, the fixed coefficient is not used because the statistical operation is hard to implement.

Namely, when the number of simultaneous connections M is below the above set value, the prediction coefficient is obtained (step S1213) by searching the prediction coefficient table of the sound cells arriving at the next cycle shown in FIG. 4 based on the number of simultaneous connections M, similarly to embodiment 1. The prediction coefficient is multiplied by the counter value to obtain the estimation value n of the sound cells arriving at the next cycle (step S1214), and the rate output value is calculated by the following expressing (step S1215). Then, counter C is cleared (step S1210).

$$\text{Rate output value } R1 = R - n/T$$

Because the ATM traffic controlling apparatus of this embodiment predicts the traffic based on the set value when the number of sound connections exceeds the specified value, and the capacity of the counter for counting the number of arriving cells can be reduced. This embodiment thereby is effective in providing more economical multiplexed transmission.

Embodiment 5.

Figure 13:
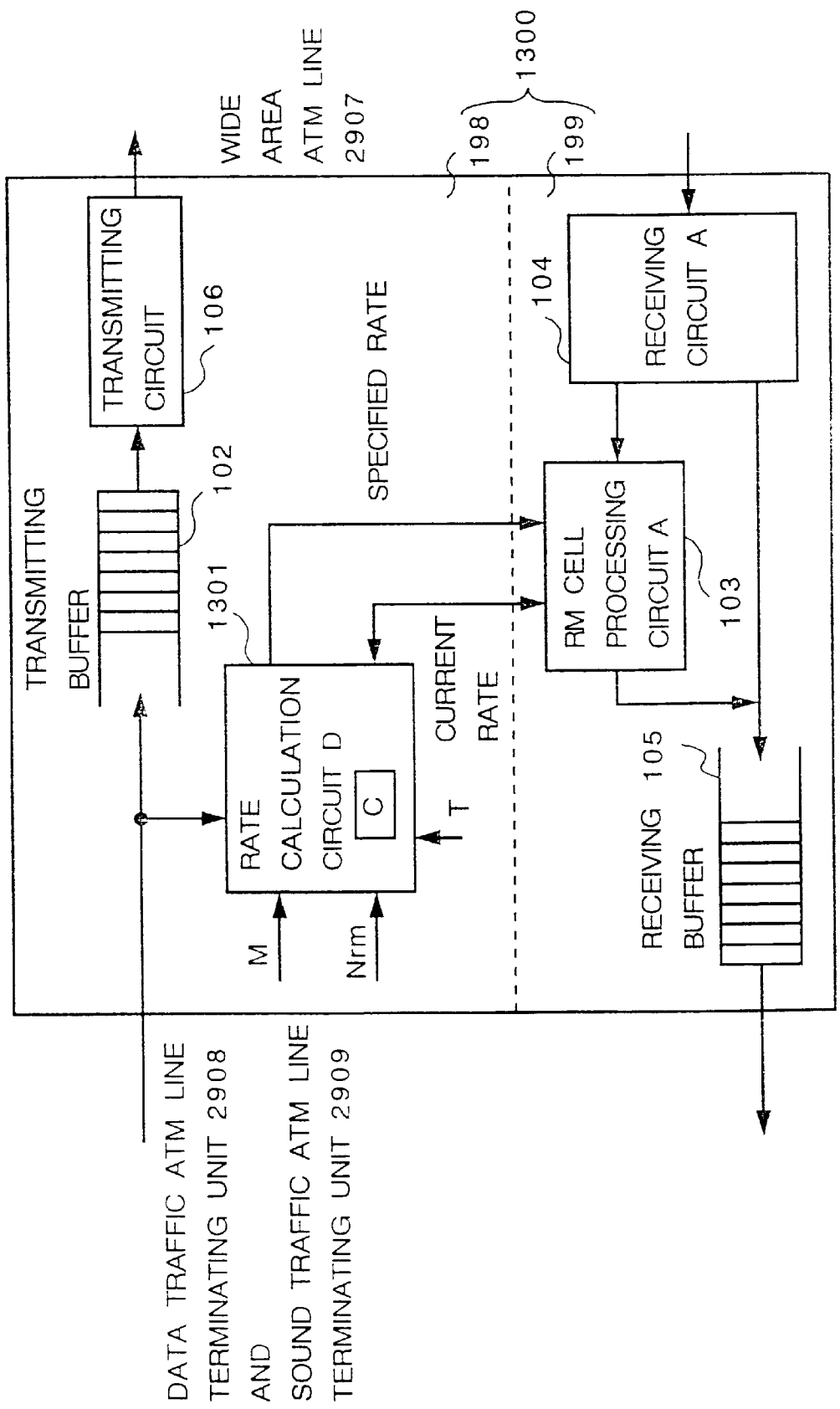
FIG. 13 shows a configuration of another embodiment of the ATM traffic controlling apparatus of the present invention.

FIG. 13 shows a configuration of another embodiment of the ATM traffic controlling apparatus of the present invention.

Figure 31:
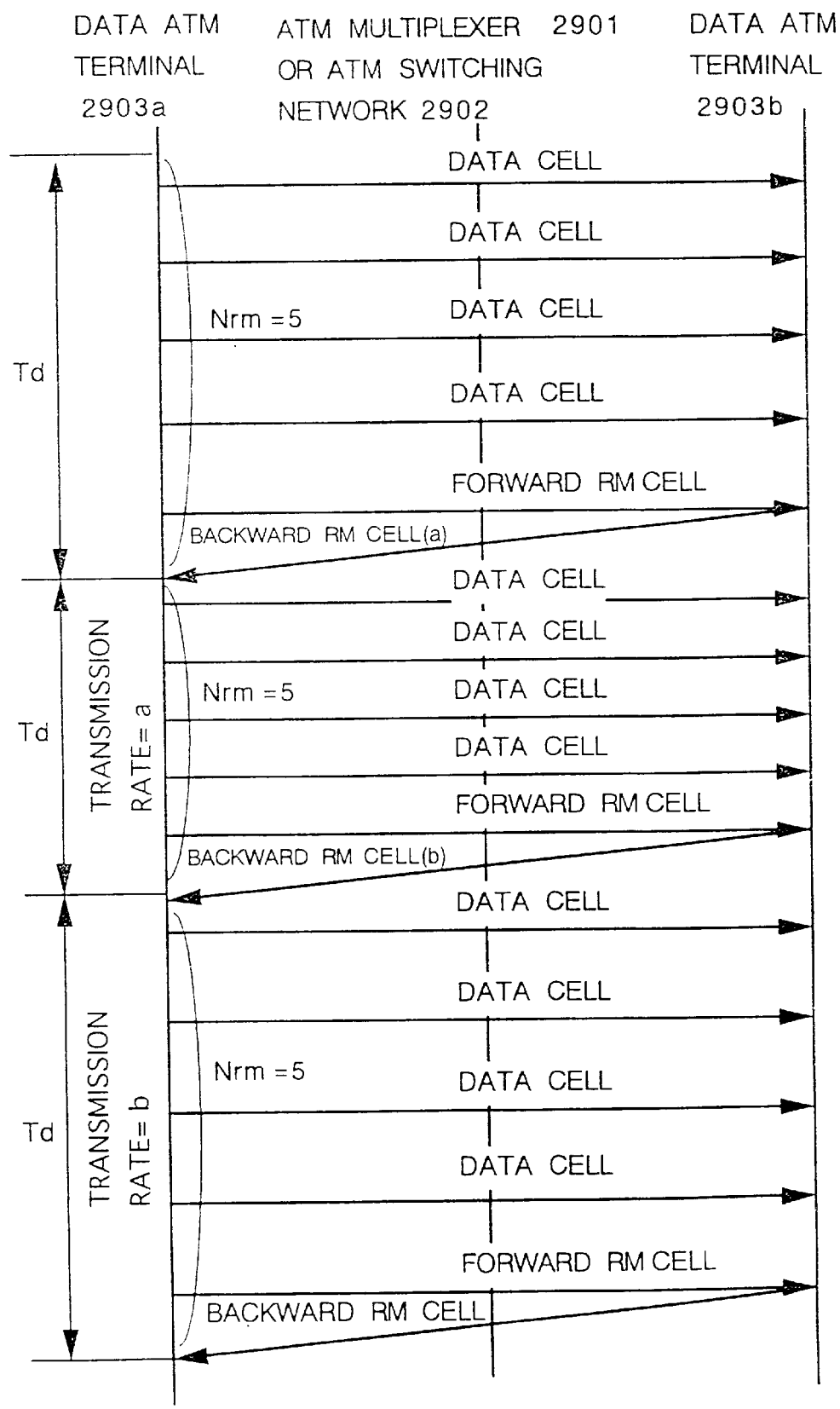
FIG. 31 is a sequence diagram showing a method of adjusting the transmission rate of the present and conventional invention.
Figure 32:
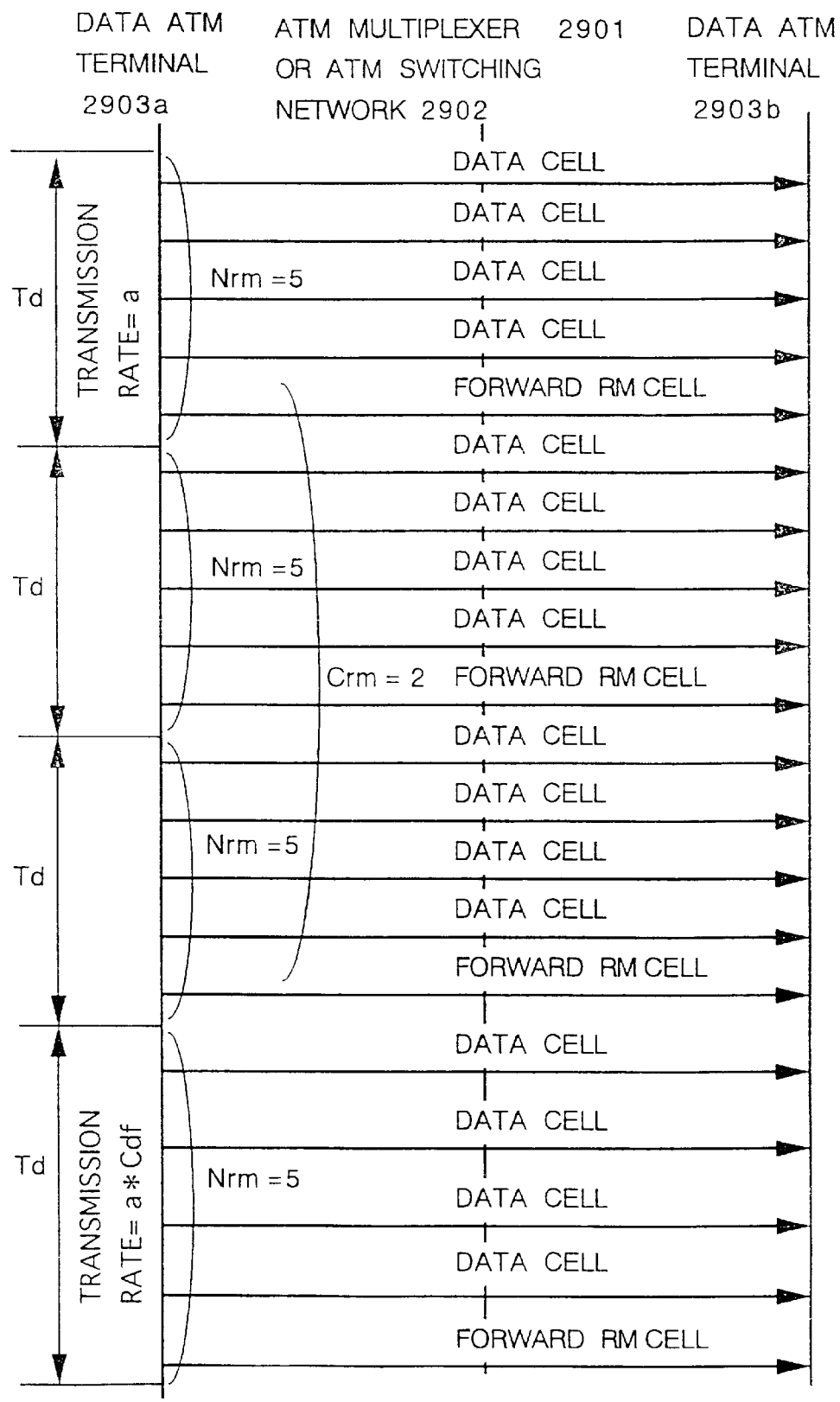
FIG. 32 is a diagram showing an adjustment sequence when a backward RM cell would not be returned to the transmitting side for some reason of the present and conventional inventions.

In the figure, signs the same as those of FIG. 1 indicate the same or corresponding components. A multiplexed transmission unit 1300, which is the ATM traffic controlling apparatus, and a rate calculation circuit D 1301 are shown. Although Embodiment 1 regarded the time interval to be predicted as the sound cell forming cycle T, Embodiment 5 applies cycle Td, which is a cycle during which data ATM terminal 2903 changes the transmission rate. As shown in FIGS. 31 or 32, because the interval to change the transmission rate of the data terminal is dependent only on the transmission rate Nrm of the RM cell (Nrm in this embodiment is assumed to be preset), the cycle Td dynamically changes as the transmission rate changes. In this embodiment, a means for estimating cycle Td is attached to rate calculation circuit D 1103.

Figure 14:
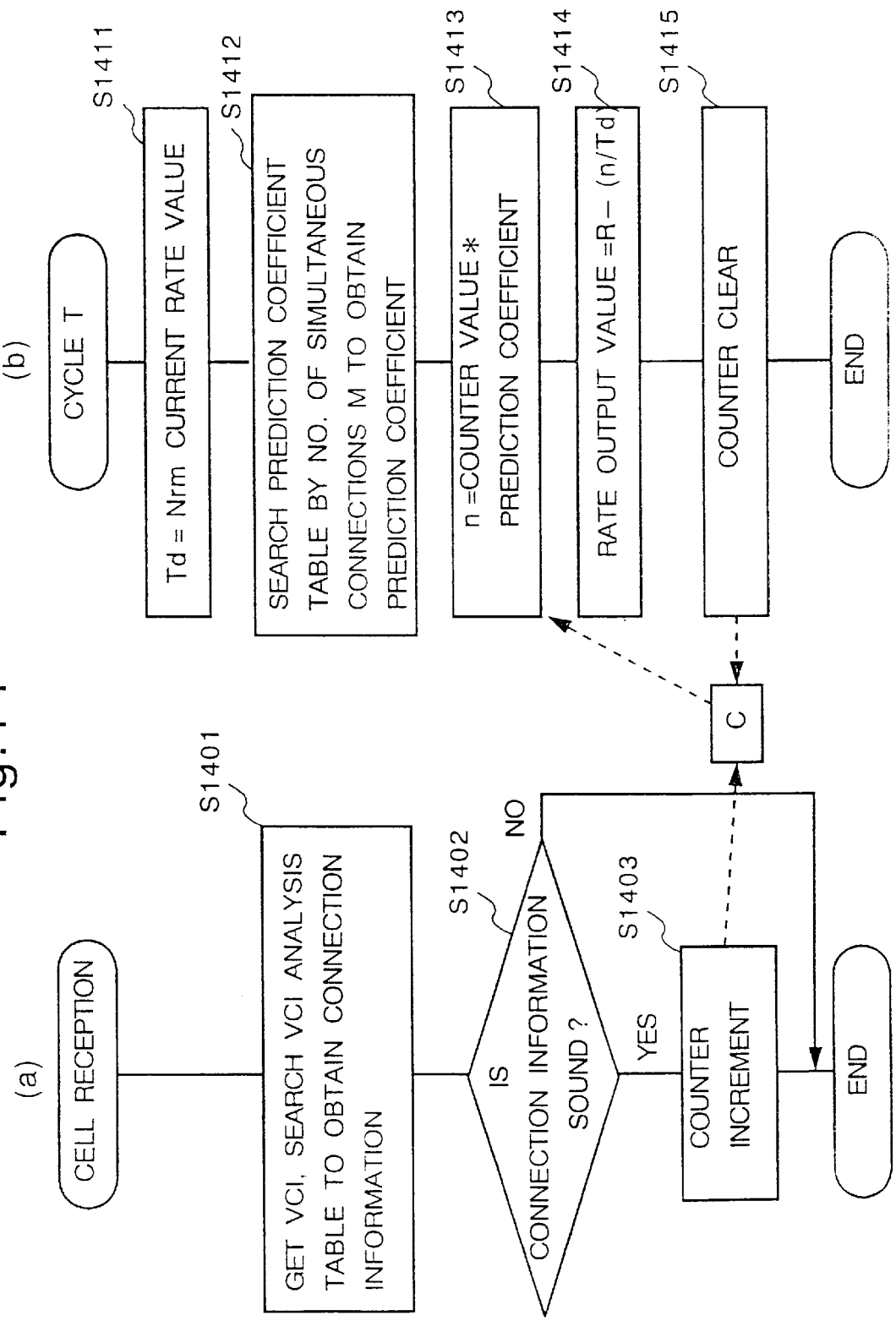
FIG. 14 is an operation flowchart of rate calculation circuit D 1103 shown in FIG. 13.

FIG. 14 is a flowchart for explaining the operation of rate calculation circuit D 1103 shown in FIG. 13.

Figure 15:
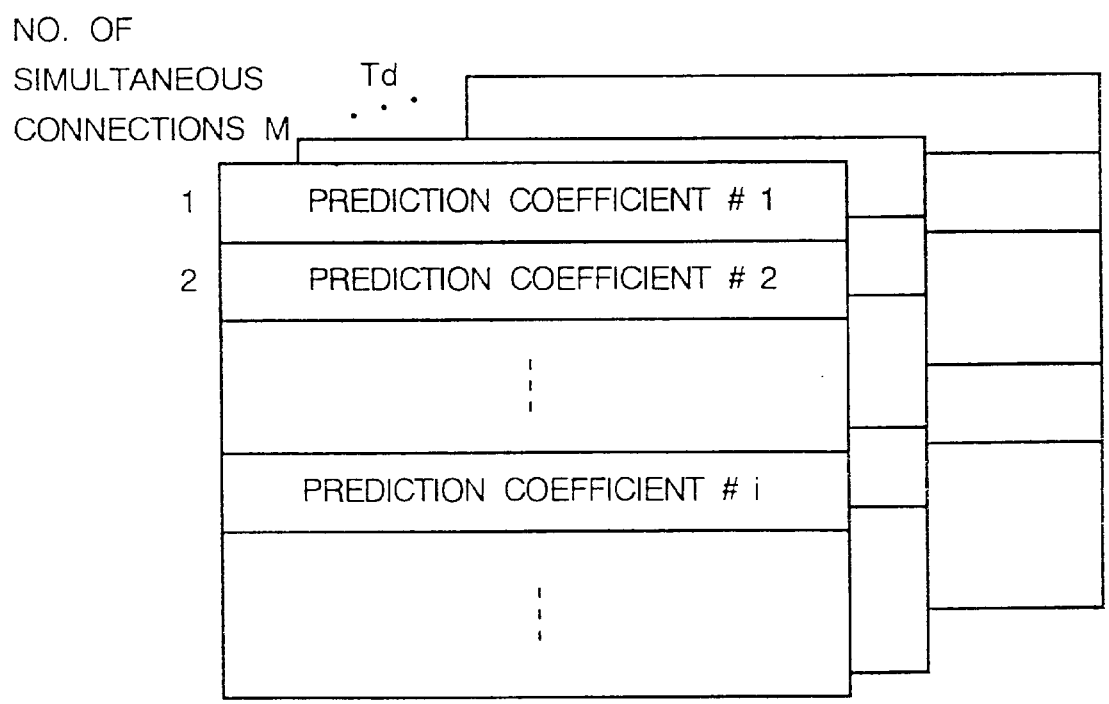
FIG. 15 shows an example of a structure of a prediction coefficient table indicated in the flowchart of FIG. 14.

FIG. 15 shows an example of the structure of prediction coefficient table indicated in the flowchart of FIG. 14.

FIGS. 28, 29, and 33 are used for the explanation of the present invention.

The operation of rate calculation circuit D 1301 shown in FIG. 13 is explained below using the flowchart of FIG. 14.

Similarly to Embodiment 1, when rate calculation circuit D 1301 receives a cell from the terminal, it gets the VCI in cell header 2802 shown in FIG. 28, and obtains the connection information by searching the VCI analysis table shown in FIG. 3 (step S1401). Then, the connection information is judged whether or not it is sound information (step S1402). If it is sound information, counter C for sound cells is incremented (step S1403). Then, cycle Td is calculated (step S1411) based on the current rate value obtained by the transmission rate Nrm for transmitting RM cells at each cycle T and the transfer rate specified value 3304 of the received RM cells, using the following expression:

Cycle Td=Nrm/current rate value.

Based on the obtained cycle Td and the number of simultaneous connections M, which is the fixed value, the prediction coefficient table of the sound cells to be arriving at the next cycle shown in FIG. 15 is searched and the prediction coefficient is read (step S1412). Then, by multiplying the obtained prediction coefficient and the sound cell counter value, the estimation value n for the number of sound cells to be arriving at the next cycle is obtained (step S1413).

Then, based on the estimation value n of the number of sound cells to be arriving and the cycle Td obtained at step S1411, the sound rate is calculated by the following expression. By subtracting the sound rate from the maximum transmission cell speed R of the wide area ATM line including the sound cell rate and data cell rate, the output to the RM cell processing circuit is updated (step S1414) with the data cell rate as the rate output value. And counter C is reset (step S1415).

Rate output value R1=R−n/Td

The ATM traffic controlling apparatus predicts the unused line capacity based on the arriving condition of the sound cell data by the unit of cycle Td in which the transmission rate from the terminal changes and the transmission rate is suppressed in accordance with the prediction for the data connection. This embodiment is effective in providing a multiplexed transmission with improved cell disposal rate.
Embodiment 6.

Figure 16:
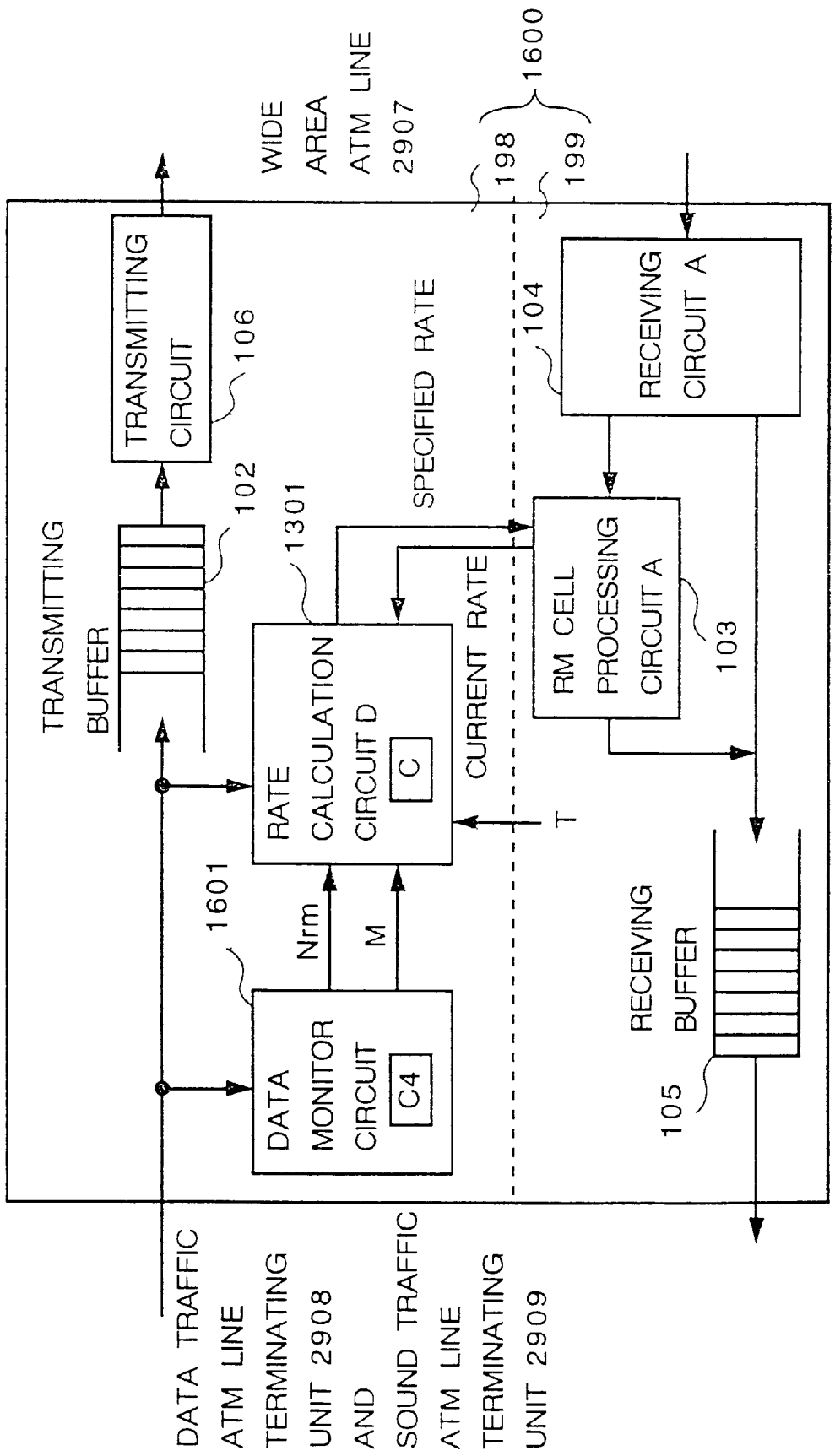
FIG. 16 shows a configuration of another embodiment of the ATM traffic controlling apparatus of the present invention.

FIG. 16 shows the configuration of another embodiment of the ATM traffic controlling apparatus of the present invention.

In the figure, signs the same as those of FIG. 13 indicate the same or corresponding components. A multiplexed transmitter 1600, which is the ATM traffic controlling apparatus, and a data monitor circuit 1601 for monitoring the transmission condition of data cells and calculating the Nrm automatically are shown. While Nrm is a preset value in Embodiment 5, data monitor circuit 1601 monitors the transmission condition of data cells and automatically calculates the transmission rate Nrm of the RM cells in this embodiment.

Figure 17:
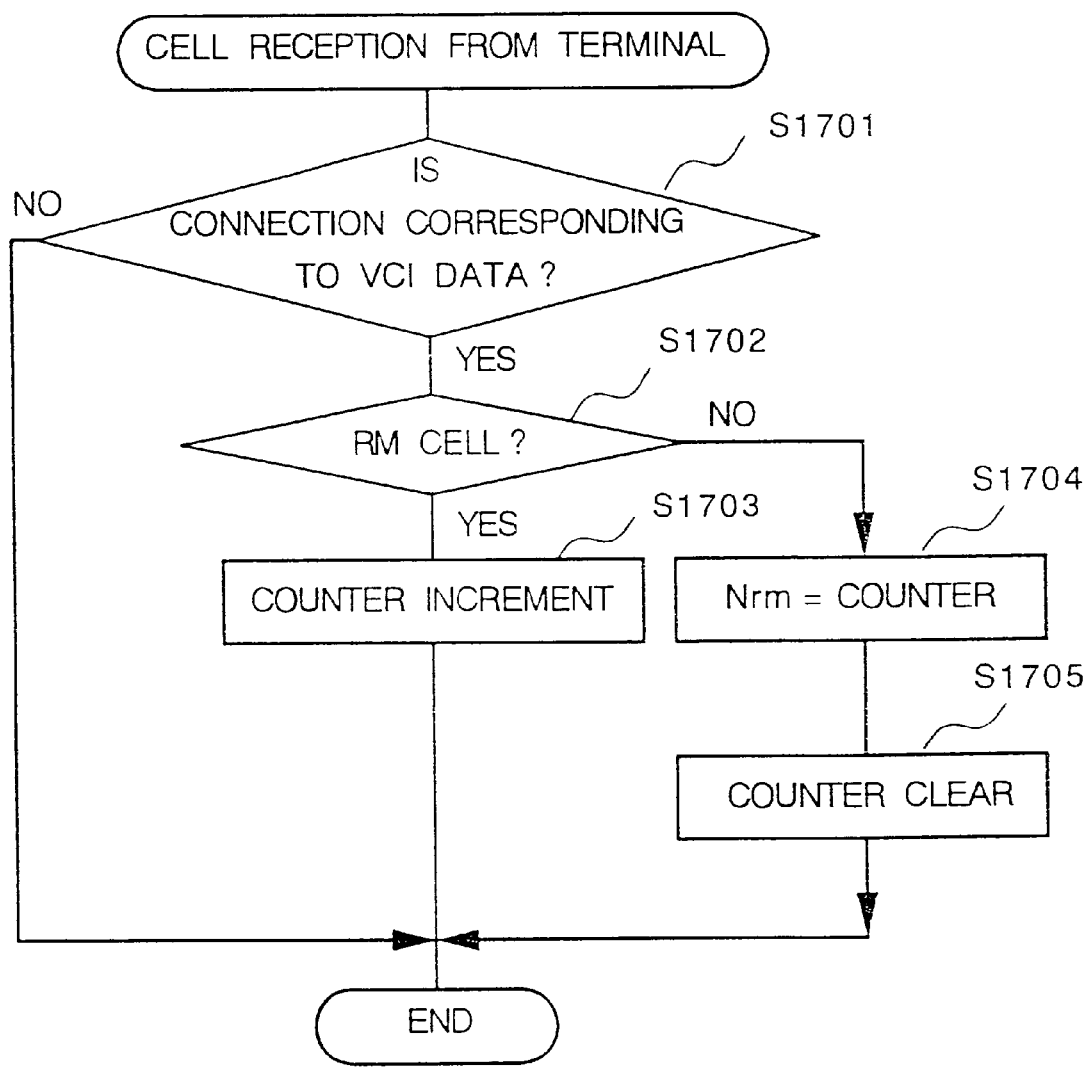
FIG. 17 is an operation flowchart of data monitor circuit 1601 shown in FIG. 16.

FIG. 17 is a flowchart explaining the operation of data monitor circuit 1601 shown in FIG. 16.

FIGS. 28, 29, and 33 are used for the explanation of this invention.

The operation of data monitor circuit 1601 shown in FIG. 16 is explained using the flowchart of FIG. 17.

A cell received from data ATM terminal 2903 and sound ATM terminal 2904 is input into data monitor circuit 1601. Data monitor circuit 1601 searches the VCI analysis table shown in FIG. 3 using the VCI in the cell header shown in FIG. 28 to get the connection information. The connection information is judged whether or not it is a data connection (step S1701). If it is a data connection, the PT inside the cell header shown in FIG. 28 is checked to determine whether or not it is a data cell or RM cell (step S1702). If it is proven to be a data cell, counter C4 is incremented (step S1703). When it turns out to be an RM cell (PT=6 as in FIG. 33), the counter value of counter C4 is set as the transmission rate Nrm of the RM cells, and is output to rate calculation circuit D 1301 (step S1704), and counter C4 is cleared (step 1705).

The ATM traffic controlling apparatus of this embodiment automatically obtains cycle Td, in which transmission rate from the terminal changes, and not by the preset fixed value. It is effective in providing multiplexed transmission with upgraded maintenance and improved cell disposal characteristics.
Embodiment 7.

Figure 18:
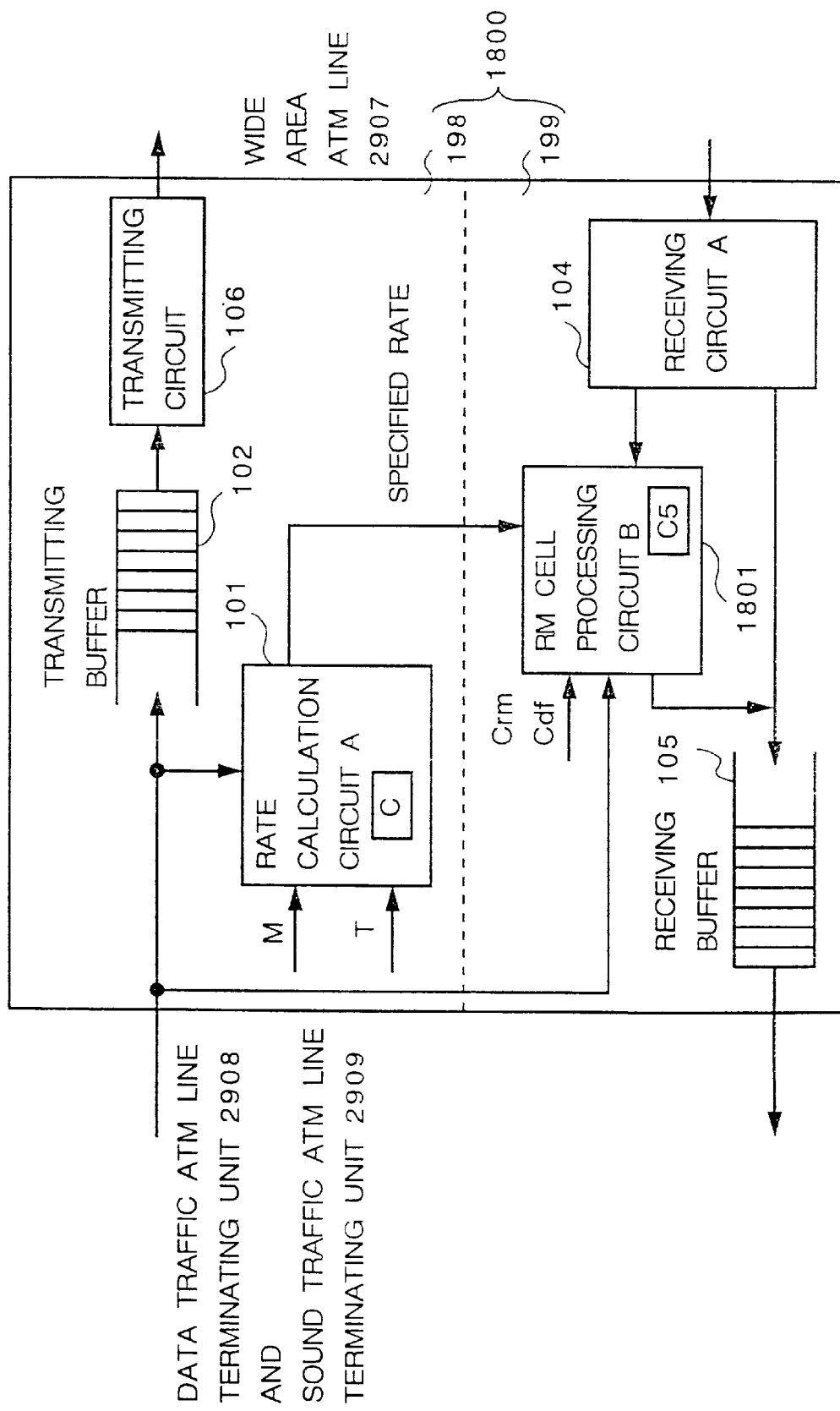
FIG. 18 shows a configuration of another embodiment of the ATM traffic controlling apparatus of the present invention.

FIG. 18 shows the configuration of another embodiment of the ATM traffic controlling apparatus of the present invention.

In the figure, signs the same as those of FIG. 1 indicate the same or corresponding components to FIG. 1. A multiplexed transmitter 1800, which is the ATM traffic controlling apparatus, and an RM cell processing circuit B 1801 are shown. This embodiment differs from previous embodiments in that RM cell processing circuit B 1801 has a circuit which monitors the absence of backward RM cell and automatically transmits the RM cells.

Figure 19:
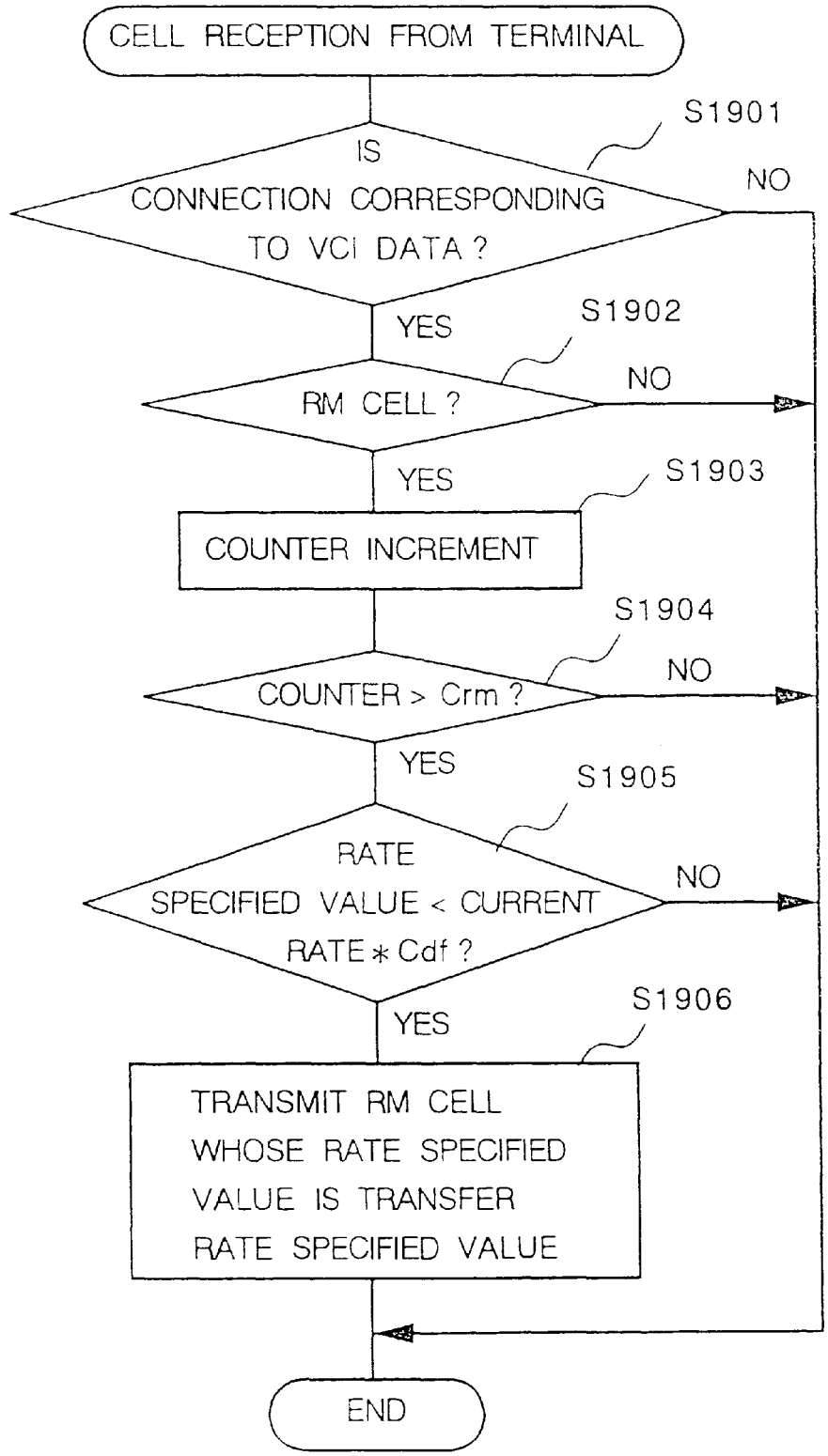
FIG. 19 is an operation flowchart of RM cell processing circuit B 1801 shown in FIG. 18 at a reception of a cell from the ATM terminal.

FIG. 19 is an operation flowchart of RM cell processing circuit B 1801 shown in FIG. 18 when a cell is received from the ATM terminal.

Figure 20:
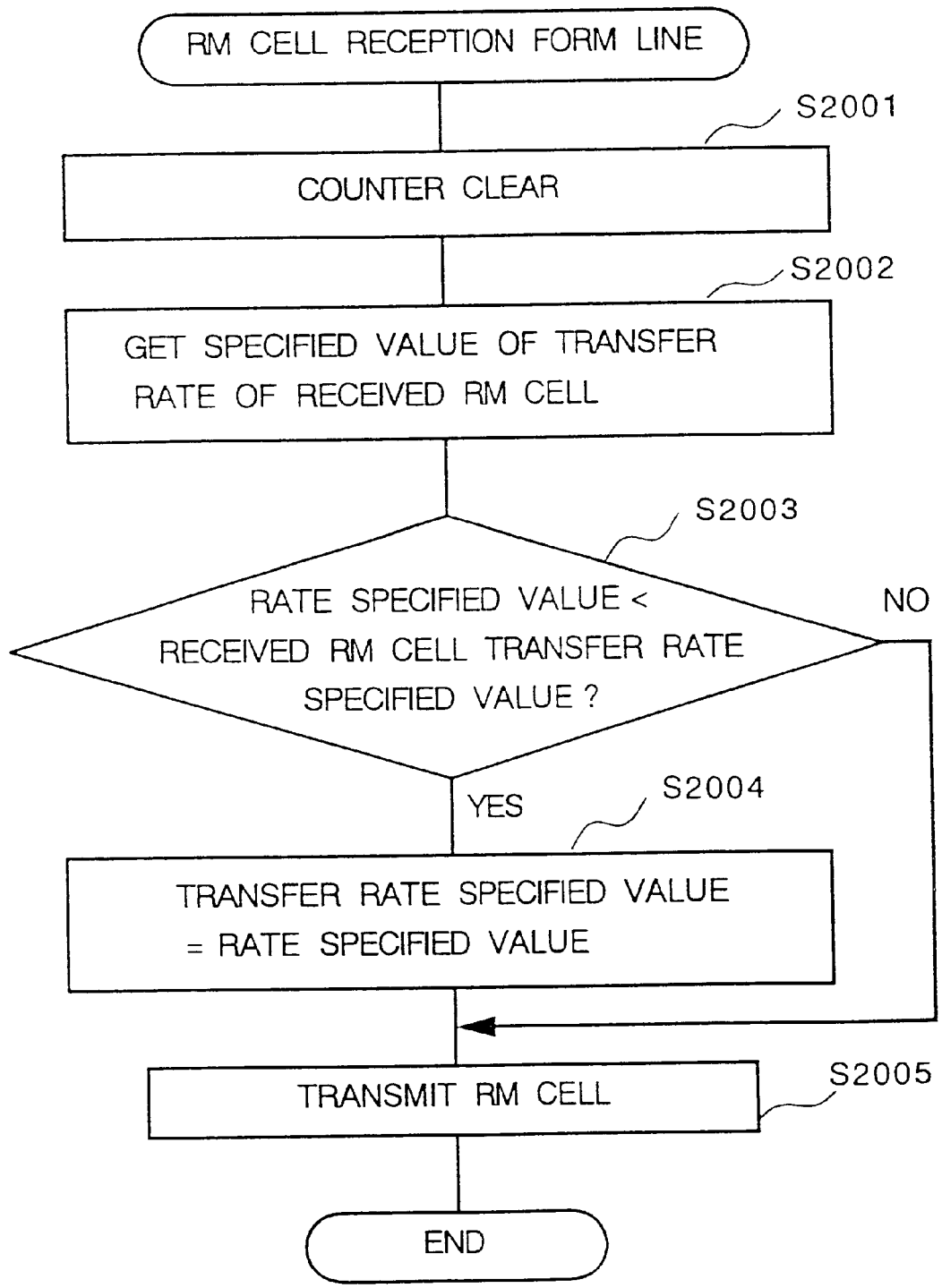
FIG. 20 is an operation flowchart of RM cell processing circuit B 1801 shown in FIG. 18 at a reception of an RM cell from the line.

FIG. 20 is an operation flowchart of RM cell processing circuit B 1801 shown in FIG. 18 when an RM cell is received from the line.

FIGS. 28, 29, and 33 are used for the explanation of this invention.

The operation of RM cell processing circuit B 1801 shown in FIG. 18 is explained below using the flowcharts shown in FIGS. 19 and 20.

The cell received from data traffic ATM line terminating unit 2908 or sound traffic ATM line terminating unit 2909 and RM cells received from wide area ATM line 2907 are input into RM cell processing circuit B 1801. Upon receiving the RM cell from the ATM terminal, the RM cell processing circuit B 1801 uses the VCI in cell header 2802 shown in FIG. 28 to search the VCI analysis table shown in FIG. 3 and obtains the connection information. Then the connection information is judged whether it is a data connection or not (step S1901).

If it is proved to be a data connection, it is determined whether or not it is a data cell or RM cell by checking the PT of header 3302 of the RM cell shown in FIG. 33 (step S1902). For the RM cells, counter C5 for the RM cells is incremented (step S1903). The counter C5 for the RM cells is checked (step S1904) to determine whether it is larger than the preset value (the number of times Crm shown in FIG. 32). If counter C value is larger, whether or not a value obtained by multiplying a different preset value (Cdf: Cutoff Decrease Factor) by the current rate value is larger than the rate specified value specified by rate calculation circuit A 101 is checked (step S1905). If larger, setting the rate specified value from rate calculation circuit A 101 as the transfer rate specified value 3304, the RM cell is transferred to receiving buffer 105, and transmitted to data traffic ATM line terminating unit 2908 (step S1906), similarly to other cells.

After receiving the RM cell from wide area ATM line 2907, RM cell processing circuit B 1801 clears counter C5 for the RM cells (step S2001).

The operation after that is the same as that of Embodiment 1. After the transfer rate specified rate of the received RM cells is obtained (step S2002), the rate specified value from rate calculation circuit A 101 is judged whether it is smaller than the rate specified value indicated by the transfer rate specified value of the received RM cells (step S2003). If it is smaller, the transfer rate specified value is replaced with the rate specified value from rate calculation circuit A 101 (step S2004), and if it is larger, the transfer rate specified value is directly transferred to receiving buffer 105 without change, and then transmitted to data traffic ATM line terminating unit 2908 (step S2005), similarly to other cells. unit 2908 (step S2005), similarly to other cells.

Because the ATM traffic controlling apparatus automatically transmits RM cells when the backward RM cell is absent, the terminal can automatically change the transmission rate even when there is no backward RM cell. And when the changed transmission rate exceeds the estimation of the unused line capacity based on the arriving condition of sound cell data, the transmission rate can further be modified, Thus, this embodiment is effective in providing a multiplexed transmitter with improved cell disposal characteristics.

Embodiment 8.

Figure 21:
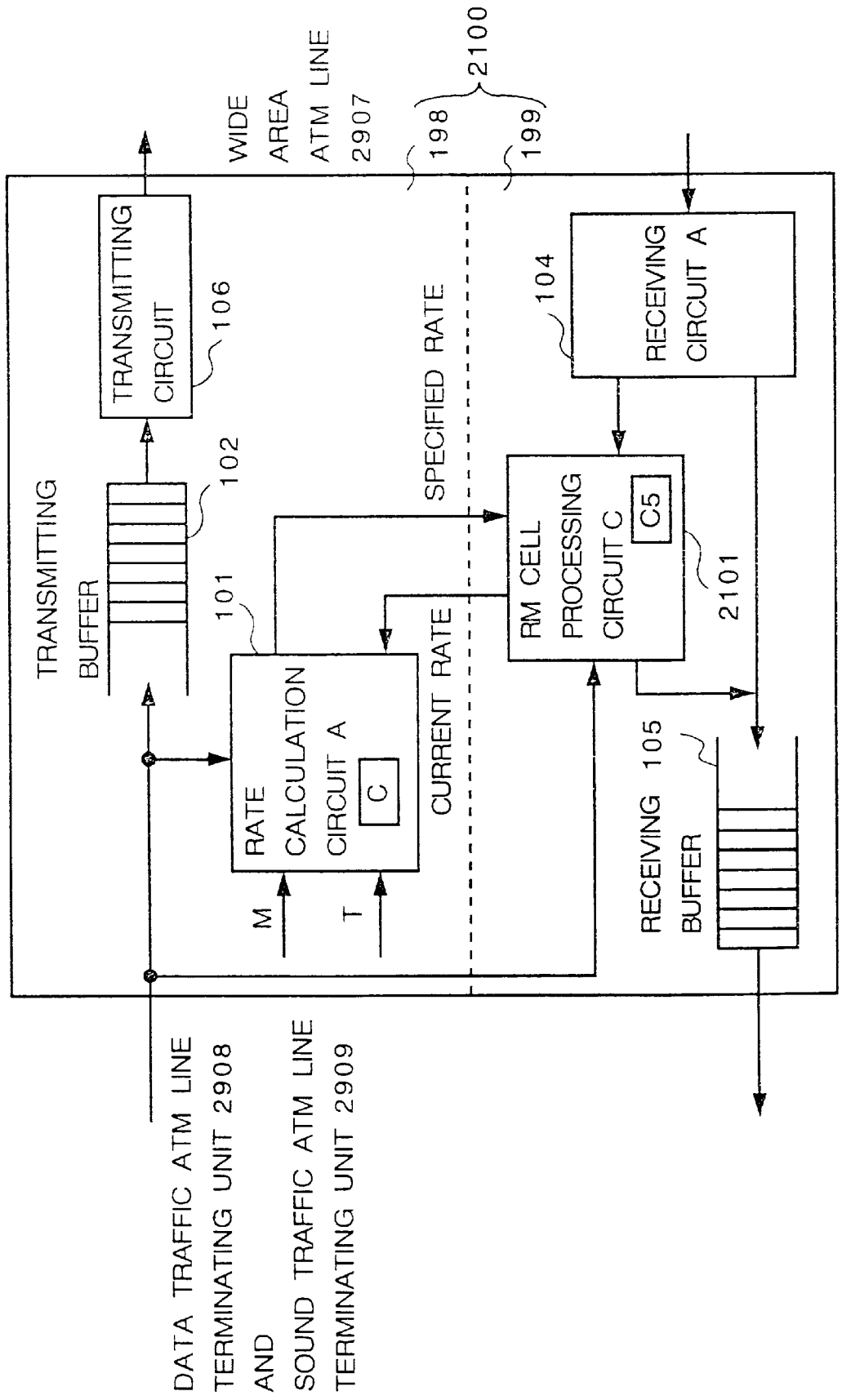
FIG. 21 shows a configuration of another embodiment of the ATM traffic controlling apparatus of the present invention.

FIG. 21 shows the configuration of another embodiment of the ATM traffic controlling apparatus of the present invention.

In the figure, signs the same as those of FIG. 18 indicate the same or corresponding components of FIG. 18. A multiplexed transmitter 2100, which is the ATM traffic controlling apparatus, and an RM cell processing circuit C 2101 are shown. Although Crm and Cdf (Cutoff Decease Factor) are the preset values in Embodiment 7, in this embodiment, a circuit for obtaining Crm and Cdf automatically by monitoring the data transmission condition of the data terminals is provided in RM cell processing circuit C 2101. Hereinafter, Crm and Cdf are called the parameters.

Figure 22:
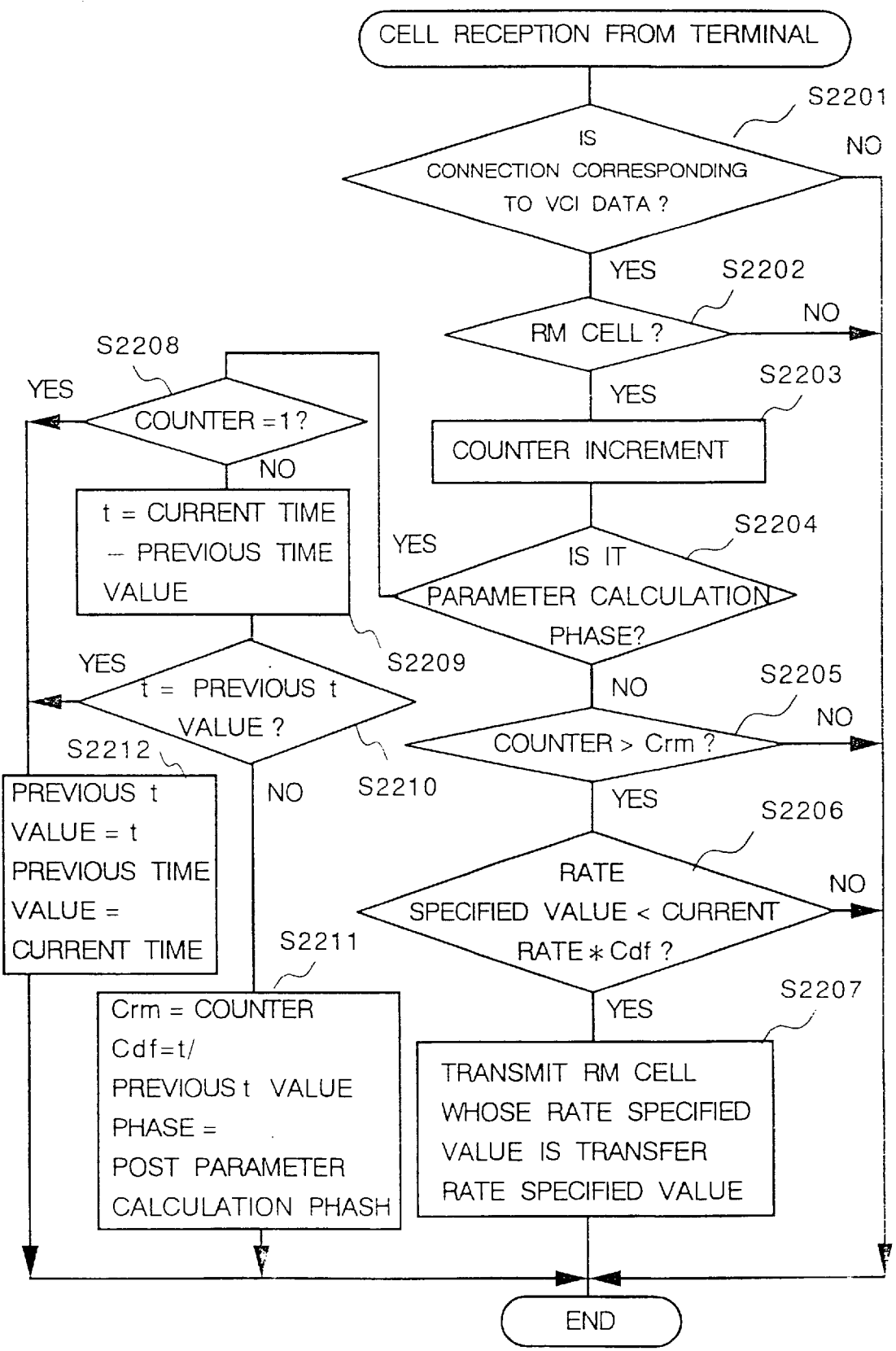
FIG. 22 is an operation flowchart of RM cell processing circuit C 2101 shown in FIG. 21 at a reception of a cell from the ATM terminal.

FIG. 22 is a flowchart explaining the operation of RM cell processing circuit C 2101 indicated in FIG. 21 when a cell is received from the ATM terminal.

Figure 23:
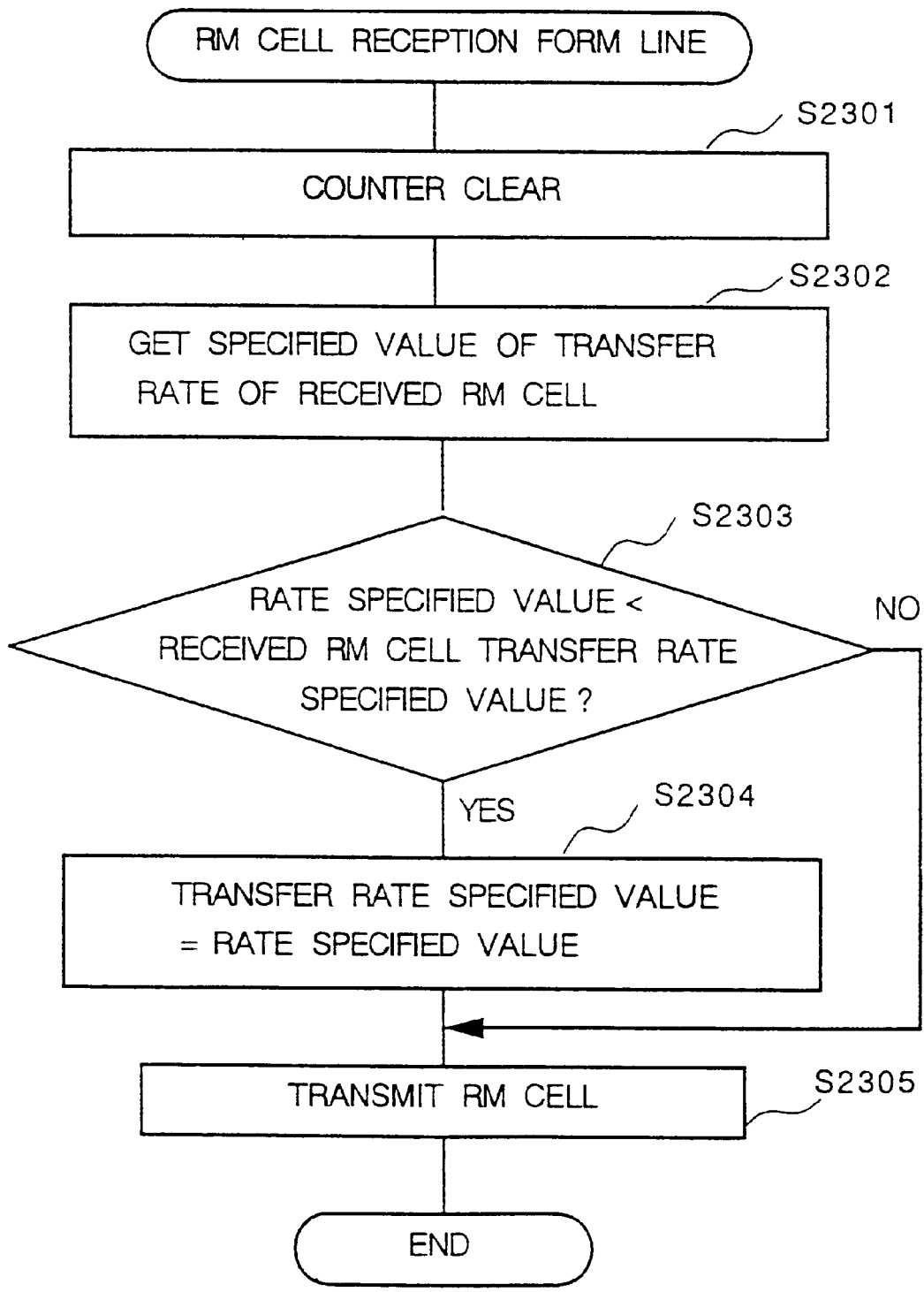
FIG. 23 is an operation flowchart of RM cell processing circuit C 2101 shown in FIG. 21 at a reception of a cell from the wide area ATM line.

FIG. 23 is a flowchart showing the operation of RM cell processing circuit C 2101 shown in FIG. 21 when a cell is received from wide area ATM line.

FIGS. 28 and 29, and 33 are used for the explanation of this invention.

The operation of RM cell processing circuit C 2101 shown in FIG. 21 is explained below using the flowchart of FIG. 23.

The cell received from data traffic ATM line terminating unit 2908 or sound traffic ATM line terminating unit 2909 and RM cell received from wide area ATM line 2907 are input into RM cell processing circuit C 2101. Upon receiving the cell from the terminal, RM cell processing circuit C 2101 uses the VCI in cell header 2802 shown in FIG. 28 to search the VCI analysis table shown in FIG. 3, and reads the connection information. The connection information is then judged whether it is a data connection (step S2201).

When the connection information is judged as a data connection, the PT of cell header 2802 shown in FIG. 28 is checked to determine whether or not the data connection is a data cell or RM cell (step S2202). When the data connection is proved to be an RM cell, counter C5 is incremented (step S2203). The operation after that is different based on parameter calculation phase and post parameter calculation phase. In the post parameter calculation phase, similarly to Embodiment 7, if the counter matches Crm (step S2205), the Cdf multiplied by the current rate value is checked whether it is smaller than the specified rate of rate calculation circuit A 101 (step S2206). If it is smaller, the RM cell set as transfer rate specified value is transferred to receiving buffer 18, and transmitted to data traffic ATM line terminating unit 11 (step S2207), similarly to other cells.

In the parameter calculation phase (step S2205), the interval time (t) of RM cells is obtained (step S2209) from the difference between the current time and the previous time value stored when the RM cell was received immediately before. Then, by comparing the interval value (previous t value) stored immediately before (step S2210), the change in the transmission rate is judged. If counter C5 is not one, the counter value of counter C5 is set as Crm. And the interval ratio (t/previous t value) obtained by dividing the current interval time (t) by the previous interval value (previous t value) is set as Cdt, and the phase is set to the post parameter calculation phase (step S2211).

When the change in the transmission rate is not found, the current time is stored as the previous time value, and the interval value is stored as the previous t value (step S2212). The operation for receiving the RM cells from the line is the same as in Embodiment 7. That is, the counter is cleared (step S2301), the transfer rate specified value indicated by the received RM cell is obtained (step S2302). If the rate specified value from rate calculation circuit A is smaller than the transfer rate specified value indicated by the received RM cell (step S2303), the transfer rate specified value is replaced with the rate specified value from calculation circuit A (step S2304). When it is larger, the transfer rate specified value is transferred to receiving buffer 18 without any change, and then transmitted to data traffic ATM line terminating unit 2908 (step S2305), similarly to other cells.

When there is no backward RM cell, the ATM traffic controlling apparatus is allowed to detect the parameters Crm and Cdf automatically by monitoring the data arriving condition based on the cycle (interval time t) for which the terminal automatically changes the transmission rate, and the changed ratio (interval time t/previous t value) and not by the preset fixed value. Thus, this embodiment is effective in providing a multiplexed transmission with excellent maintenance and improved cell disposal characteristics.

Embodiment 9.

Figure 24:
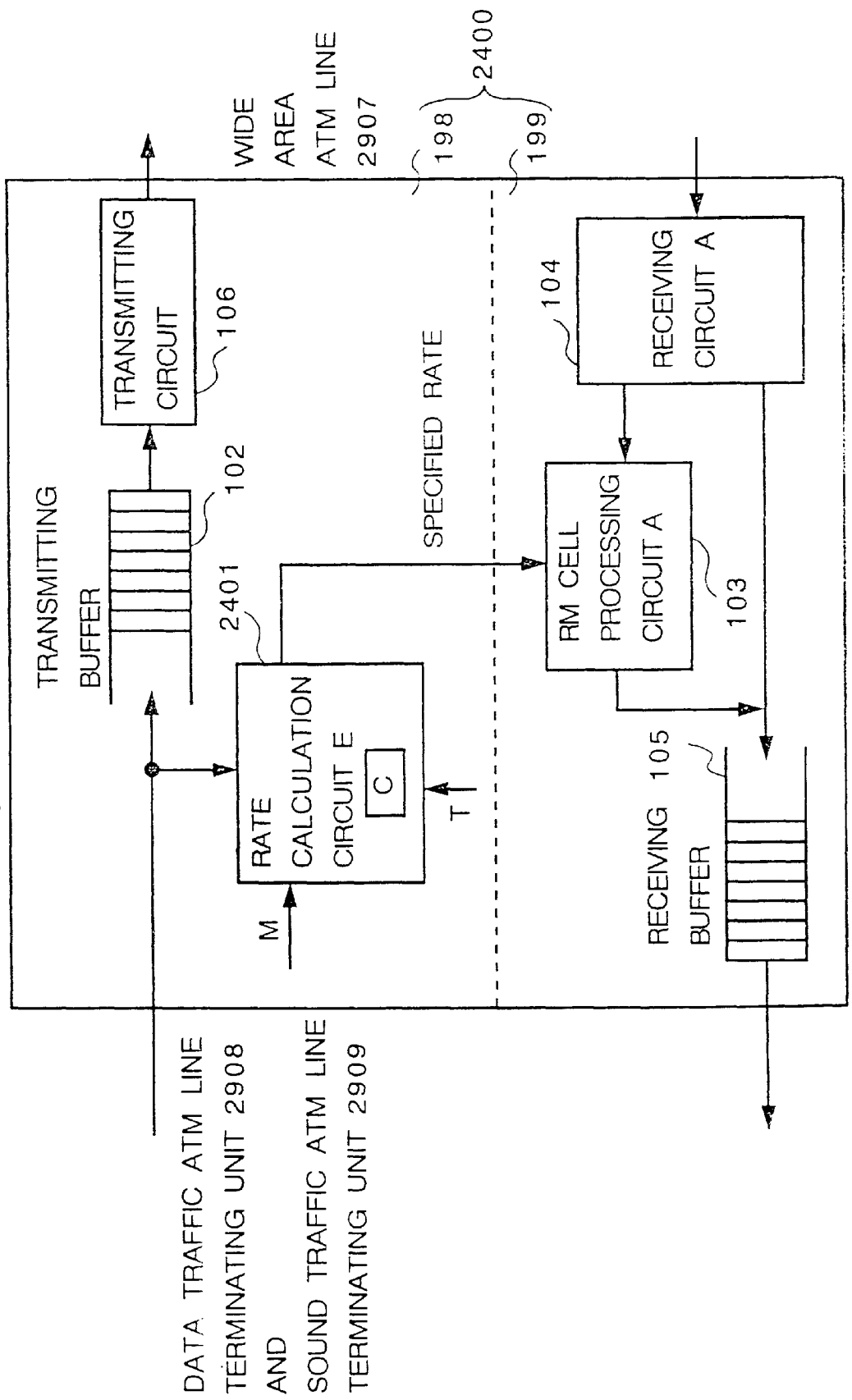
FIG. 24 shows a configuration of another embodiment of the ATM traffic controlling apparatus of the present invention.

FIG. 24 shows the configuration of another embodiment of the ATM traffic controlling apparatus of the present invention.

In the figure, signs the same as those of FIG. 1 indicate the same or corresponding components. A multiplexed transmitter 2400, which is the ATM traffic controlling apparatus, and a rate calculation circuit E 2401 are shown.

Although the previous embodiments calculate the rate using the predetermined prediction coefficient because sound characteristics are known, this embodiment is characterized in that a circuit which automatically corrects the prediction coefficient by observing the arriving condition of the sound cells is provided in the rate calculation circuit E 2401.

Figure 25:
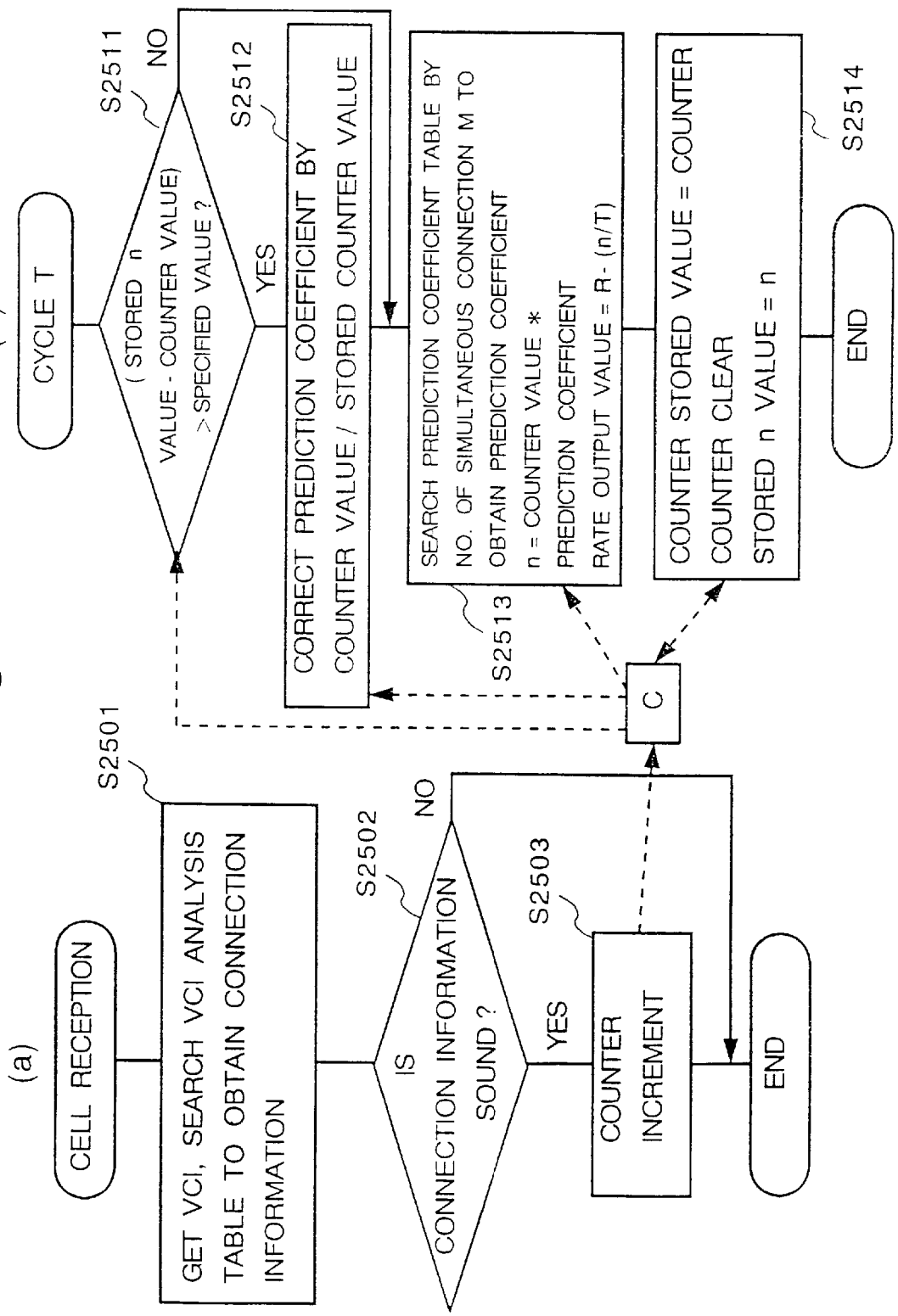
FIG. 25 is an operation flowchart of rate calculation circuit E 2401 shown in FIG. 24.

FIG. 25 is a flowchart showing the operation of rate calculation circuit E 2401 shown in FIG. 24.

FIGS. 28, 29, and 33 is used for the explanation of the present invention.

The operation of rate calculation circuit E 2401 shown in FIG. 24 is explained using the flowchart of FIG. 25.

After receiving a cell from the terminal, rate calculation circuit E 2401 uses the VCI in cell header 2802 of the cell format shown in FIG. 28 to search the VCI analysis table shown in FIG. 3, and obtains connection information (step S2501). The connection information is judged to determine whether it is sound information or not (step S2502). When it is sound information, counter C is incremented (step S2503).

Rate calculation circuit E 2401 has a circuit that is automatically activated at the fixed cycle (T). The circuit checks whether the difference between the current counter value from the value estimated at the time of previous cycle (stored n value) exceeds the specified value (step S2511). If the difference is larger than the specified value, the prediction error is assumed to be large. The comparison ratio between the current counter value and the previous stored counter value is regarded as the new prediction coefficient, and the prediction coefficient table is updated (step S2512). The operation after that is the same as that of rate calculation circuit A 101 of Embodiment 1. The prediction coefficient obtained by indexing the prediction coefficient table shown in FIG. 4 based on the number of simultaneous connections M is multiplied by the counter value, and the estimation value n of the number of sound cells arriving at the next cycle is obtained.

Meanwhile, the value estimated in the previous cycle is stored, and the rate is calculated by the following expression and then the output to the RM cell processing circuit is updated (step S2513).

$$\text{Rate output value } R1 = R - n/T$$

Then, the counter value and prediction value are stored to be used for the judgement at the next cycle, and counter C is reset (step S2514).

The ATM traffic controlling apparatus of this embodiment is allowed to correct the prediction method based on the arriving condition of the sound cells by comparing with the number of cells that have actually arrived. Thus, it is effective in providing a multiplexed transmission with excellent maintenance and improved cell disposal characteristics without having to adjust the parameters strictly.

Embodiment 10.

Figure 26:
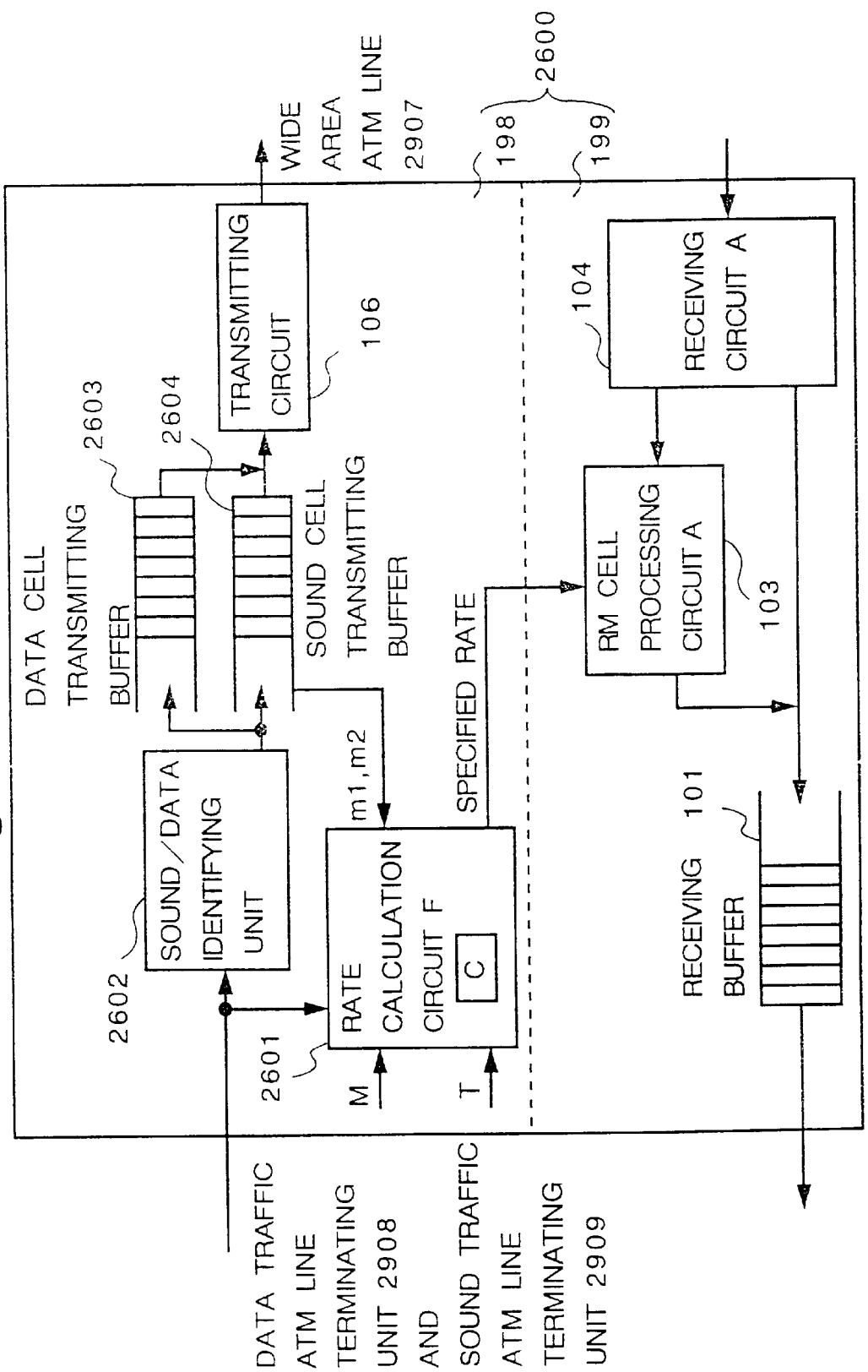
FIG. 26 shows a configuration of another embodiment of the ATM traffic controlling apparatus of the present invention.

FIG. 26 shows the configuration of another embodiment of the ATM traffic controlling apparatus of the present invention.

In the figure, signs the same as those of FIG. 1 indicate the same or corresponding components of FIG. 1. A multiplexed transmitter 2600, which is the ATM traffic controlling apparatus, a rate calculation circuit F 2601, a sound/data identifying unit 2602, a data cell transmitting buffer 2603 for temporarily storing data cells for transmission, and a sound cell transmitting buffer 2604 for temporarily storing sound cells for transmission are illustrated. Although previous embodiments shared the transmitting buffer for both sound and data, this embodiment is provided with a data terminal buffer and a sound buffer. In addition, this embodiment is characterized by a circuit for calculating the rate based on the remaining capacity of a data buffer provided in rate calculation circuit F 2601.

Figure 27:
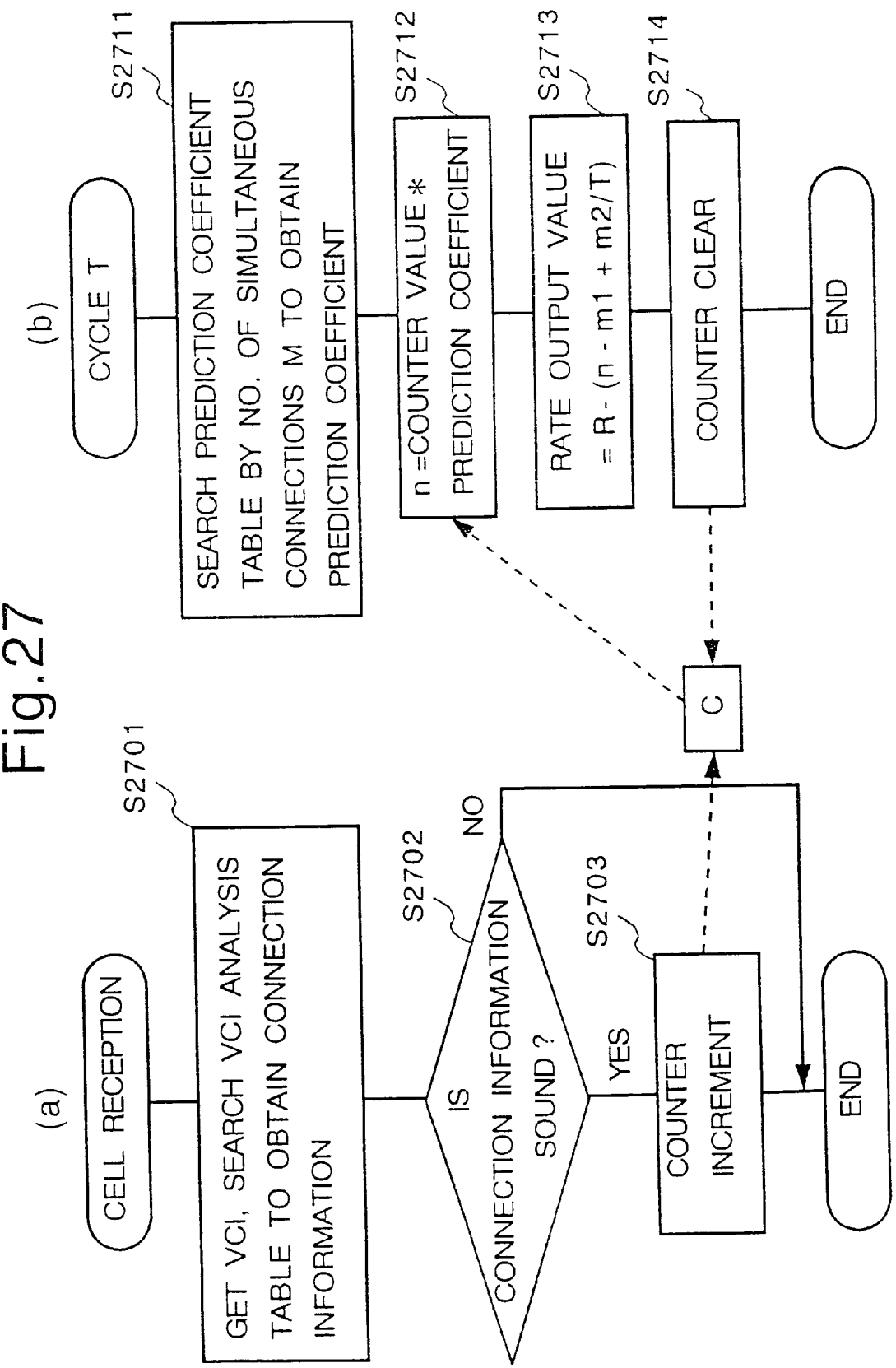
FIG. 27 is an operation flowchart of rate calculation circuit F 1001 shown in FIG. 26.

FIG. 27 is a flowchart showing the operation of rate calculation circuit F 2601 shown in FIG. 26.

FIGS. 28, 29 and 33 are used for the explanation of this invention.

The operation of rate calculation circuit F 2601 shown in FIG. 26 is explained using the flowchart of FIG. 27.

Rate calculation circuit F 2601 uses the VCI in cell header 2802 of the cell format shown in FIG. 28 when a cell is received from the ATM terminal to search the VCI analysis table shown in FIG. 3, and obtains the connection information (step S2701). Then, the connection information is judged to determine whether it is sound information or not (step S2702), and if it turns out to be sound information, counter C is incremented (step S2703).

Rate calculation circuit F 2601 is provided with a circuit which is activated at the fixed cycle (T). The circuit searches the prediction coefficient table shown in FIG. 4 based on the number of simultaneous connections M and obtains the prediction coefficient (step S2711). Then, the prediction coefficient is multiplied by the counter for sound cells obtained at step S2703, and obtains the estimation value n for the sound cells to be arriving at the next cycle.

Next, with the estimation value n, the number of cells (hereinafter m1) waiting for transmission which indicates the use condition of data cell transmitting buffer 2603, and the number of unused buffers (hereinafter m2), the rate output value R1 is calculated using the following expression, and then the output to RM cell processing circuit A 103 is updated (step S2713) and the counter is reset (step S2714).

$$\text{Rate output value } R1 = R - (n + m1 - m2)/T$$

The ATM traffic controlling apparatus is provided with a buffer special for data cells, and the transmission rate is determined by the unused line capacity based on the using condition of the buffer and the arriving condition of the sound cell data. Because the transmission rate can be suppressed in accordance with the unused line capacity, a prediction error will be absorbed by the buffer. Thus, this embodiment is effective in providing a multiplexed transmission with improved cell disposal characteristics.

Industrial Applicability

The ATM traffic controlling apparatus and its method predict the unused line capacity based on the arriving condition of sound cell data, and suppress the transmission rate in accordance with the unused line capacity. Therefore, this invention is effective in providing a multiplexed transmission with improved cell disposable characteristics.

The ATM multiplexed transmitter of this invention outputs a plurality of connections for transferring sound information and connection for transferring data information from the same output port, and achieves a cost-saving ATM traffic controlling apparatus and the method which are able to satisfy the sound quality, and suppress the data cell disposable rate under the appropriate value.

What is claimed is:

1. An asynchronous transfer mode (ATM) traffic controlling apparatus incorporated in an ATM multiplexed transmitter, for accommodating a plurality of sound connections for transferring sound information using sound cells among sound ATM terminals and a data connection for transferring data information among data ATM terminals using RM cells including data traffic controlling cells, in an ATM line, the apparatus comprising:

a transmission rate determining unit for monitoring an arriving condition of sound cells for a plurality of sound connections, the sound cells being sent from sound ATM terminals during a first cycle, for predicting a number of sound cells arriving during a second cycle, after the first cycle, and for determining a transmission rate of data traffic;

a transmission rate changing unit receiving data traffic controlling cells from an ATM line, for setting a transmission rate of the data traffic controlling cells, and for transmitting data traffic controlling cells to data ATM terminals;

a transmitting buffer for receiving data cells from the data ATM terminals and the sound cells from the sound ATM terminals, and for storing the data and sound cells;

a transmitting circuit for transmitting the data and sound cells from the transmitting buffer;

a rate calculation circuit for producing a prediction coefficient based on the number of sound connections connected simultaneously, and for calculating a transfer rate based on the prediction coefficient and the number of sound cells predicted to be arriving;

an RM cell processing circuit for processing RM cells including a specified transfer rate which specifies a transfer rate of a data ATM terminal on a transmitting side;

a receiving circuit for receiving the data and sound cells; and a receiving buffer for storing received data cells, wherein the RM cell processing circuit replaces the transfer rate specified in the RM cells with the transfer rate from the rate calculation circuit when the transferable transfer rate from the rate calculation circuit is smaller than the transfer rate specified in the RM cell.

2. The ATM traffic controlling apparatus of claim 1, wherein the rate calculation circuit determines whether the sound cells are sound band data, monitors the arriving condition for the sound cells having sound information and for the sound cells having sound band data, predicts the number of sound cells arriving during the second cycle based on a monitored result, and determines the transmission rate of the data traffic.

3. An asynchronous transfer mode (ATM) traffic controlling apparatus incorporated in an ATM multiplexed transmitter, for accommodating a plurality of sound connections for transferring sound information using sound cells among sound ATM terminals and a data connection for transferring data information among data ATM terminals using RM cells including data traffic controlling cells, in an ATM line, the apparatus comprising:

a transmission rate determining unit for monitoring an arriving condition of sound cells for a plurality of sound connections, the sound cells being sent from sound ATM terminals during a first cycle, for predicting a number of sound cells arriving during a second cycle, after the first cycle, and for determining a transmission rate of data traffic;

a transmission rate changing unit receiving data traffic controlling cells from an ATM line, for setting a transmission rate of the data traffic controlling cells, and for transmitting data traffic controlling cells to data ATM terminals;

a transmitting buffer for storing data cells from the data ATM terminals and the sound cells from the sound ATM terminals;

a transmitting circuit for transmitting the data and sound cells from the transmitting buffer;

a signaling monitor circuit for monitoring signaling information, and for determining the number of sound connections based on the signaling information;

a rate calculation circuit for producing a prediction coefficient based on the number of simultaneous sound connections, and calculating a transfer rate based on the prediction coefficient and the number of the sound cells predicted to be arriving;

an RM cell processing circuit for processing RM cells including a transfer rate specified for the data ATM terminals on a transmitting side;

a receiving circuit for receiving the data and sound cells; and a receiving buffer for storing received data cells.

4. The ATM traffic controlling apparatus of claim 3, wherein the rate calculation circuit predicts the arriving condition of the sound cells arriving during the second cycle based on the number of simultaneous sound connections, when the number of simultaneous sound connections exceeds a specified value.

5. The ATM traffic controlling apparatus of claim 1, wherein the rate calculation circuit predicts a cycle for which a data ATM terminal changes its transmission rate and the number of sound cells predicted to be arriving during the cycle based on arriving condition of the sound cells.

6. An asynchronous transfer mode (ATM) traffic controlling apparatus incorporated in an ATM multiplexed transmitter, for accommodating a plurality of sound connections for transferring sound information using sound cells among sound ATM terminals and a data connection for transferring data information among data ATM terminals using RM cells including data traffic controlling cells, in an ATM line, the apparatus comprising:

a transmission rate determining unit for monitoring an arriving condition of sound cells for a plurality of sound connections, the sound cells being sent from sound ATM terminals during a first cycle, for predicting a number of sound cells arriving during a second cycle, after the first cycle, and for determining a transmission rate of data traffic;

a transmission rate changing unit receiving data traffic controlling cells from an ATM line, for setting a transmission rate of the data traffic controlling cells, and for transmitting data traffic controlling cells to data ATM terminals;

a transmitting buffer for receiving data cells from the data ATM terminals and the sound cells from the sound ATM terminals, and storing the data and sound cells;

a transmitting circuit for transmitting the data and sound cells from the transmitting buffer;

a rate calculation circuit for producing a prediction coefficient based on the number of sound connections connected simultaneously, and for calculating a transfer rate based on the prediction coefficient and the number of sound cells predicted to be arriving;

an RM cell processing circuit for processing RM cells including a transfer rate specified for specifying a transfer rate of data ATM terminals on a transmitting side;

a receiving circuit for receiving the data and sound cells;

a receiving buffer for storing received data cells; and a data monitor circuit for monitoring the arriving condition of the data cells and for calculating a cycle for which the data ATM terminals change transmission rate.

7. The ATM traffic controlling apparatus of claim 1, wherein the RM cell processing circuit monitors the arriving condition of a backward RM cell, and when no backward RM cell is detected, the RM cell processing circuit automatically transmits a backward RM cell.

8. The ATM traffic controlling apparatus of claim 1, wherein the RM cell processing circuit monitors the arriving condition of the data for the data connection, and selects a cycle for which the data ATM terminals change transmission rate when a backward RM cell is not detected.

9. The ATM traffic controlling apparatus of claim 1, wherein the rate calculation circuit automatically corrects the prediction coefficient for calculating the number of sound cells arriving during the second cycle based on the arriving condition of the sound cells for the plurality of sound connections.

10. The ATM traffic controlling apparatus of claim 1, wherein the rate calculation circuit includes buffers for storing the sound cells and the data cells separately, and determines the transmission rate of the data traffic based on storing of the data cells and the arriving condition of the sound cells in the plurality of sound connections.

11. An asynchronous transfer mode (ATM) traffic controlling method incorporated in an ATM multiplexed transmitter, for accommodating a plurality of sound connections for transferring sound information using sound cells among sound ATM terminals and a data connection for transferring data information among data ATM terminals using RM cells including data traffic controlling cells, in an ATM line, the method comprising:

determining a transmission rate by monitoring arriving condition of sound cells for a plurality of sound connections, the sound cells being sent from sound ATM terminals during a first cycle, predicting a number of sound cells arriving during a second cycle, after the first cycle, and determining a transmission rate of data traffic;

changing a transmission rate by receiving the data traffic controlling cells from an ATM line, setting the transmission rate of the data traffic controlling cells, and transmitting data traffic controlling cells to the data ATM terminals;

receiving the data cells from the data ATM terminals and the sound cells from the sound ATM terminals, and storing the data and sound cells in a transmitting buffer, transmitting the data and sound cells from the transmitting buffer;

producing a prediction coefficient based on the number of sound connections connected simultaneously, and calculating a transfer rate based on the prediction coefficient and the number of sound cells predicted to be arriving;

processing RM cells including a specified transfer rate which specifies a transfer rate for a data ATM terminal on a transmitting side;

receiving the data and sound cells; and storing received data cells in a receiving buffer, wherein processing the RM cells replaces the transfer rate specified in the RM cells with the transfer rate from the rate calculation circuit when the transfer rate from the rate calculation circuit is smaller than the transfer rate specified in the RM cell.

12. The ATM traffic controlling method of claim 11, including determining whether the sound cells are sound band data, monitoring the arriving condition of sound cells having sound information and the sound cells having sound band data, predicting the number of sound cells arriving during the second cycle based on a monitored result, and determining the transmission rate of the data traffic.

13. An asynchronous transfer mode (ATM) traffic controlling method incorporated in an ATM multiplexed transmitter, for accommodating a plurality of sound connections for transferring sound information using sound cells among sound ATM terminals and a data connection for transferring data information among data ATM terminals using RM cells including data traffic controlling cells, in an ATM line, the method comprising:

determining a transmission rate by monitoring arriving condition of sound cells for a plurality of sound connections, the sound cells being sent from sound ATM terminals during a first cycle, predicting a number of sound cells arriving during a second cycle, after the first cycle, and determining a transmission rate of data traffic;

changing a transmission rate by receiving the data traffic controlling cells from an ATM line, setting the transmission rate of the data traffic controlling cells, and transmitting data traffic controlling cells to the data ATM terminals;

storing data cells from the data ATM terminals and the sound cells from the sound ATM terminals in a transmitting buffer;

transmitting the data and sound cells from the transmitting buffer;

monitoring signaling information, and determining the number of sound connections connected simultaneously based on the signaling information;

producing a prediction coefficient based on the number of simultaneous sound connections, and calculating a transfer rate based on the prediction coefficient and the number of sound cells predicted to be arriving;

processing the RM cells including a transfer rate specified for the data ATM terminals on a transmitting side;

receiving the data and sound cells; and storing received data cells.

14. The ATM traffic controlling method of claim 13, including predicting the arriving condition of the sound cells arriving during the second cycle based on the number of simultaneous connections, when the number of simultaneous sound connections exceeds a specified value.

15. The ATM traffic controlling method of claim 11, including predicting a cycle for which a data ATM terminal changes its transmission rate and the number of sound cells predicted to be arriving during the cycle based on arriving condition of the sound cells.

16. An asynchronous transfer mode (ATM) traffic controlling method incorporated in an ATM multiplexed transmitter, for accommodating a plurality of sound connections for transferring sound information using sound cells among sound ATM terminals and a data connection for transferring data information among data ATM terminals using RM cells including data traffic controlling cells, in an ATM line, the method comprising:

determining a transmission rate by monitoring arriving condition of sound cells for a plurality of sound connections, the sound cells being sent from sound ATM terminals during a first cycle, predicting a number of sound cells arriving during a second cycle, after the first cycle, and determining a transmission rate of data traffic;

changing a transmission rate by receiving the data traffic controlling cells from an ATM line, setting the transmission rate of the data traffic controlling cells, and transmitting data traffic controlling cells to the data ATM terminals;

receiving the data cells from the data ATM terminals and the sound cells from the sound ATM terminals, and storing the data and sound cells in a transmitting buffer;

transmitting the cells from the transmitting buffer;

producing a prediction coefficient based on the number of simultaneous sound connections, and calculating a transfer rate based on the prediction coefficient and the number of sound cells predicted to be arriving;

processing the RM cells including a transfer rate specified for specifying a transfer rate of a data ATM terminal on a transmitting side;

receiving the data and sound cells;

storing received data cells in a receiving buffer; and monitoring the arriving condition of the data cells and calculating a cycle for which the data terminals change transmission rate.

17. The ATM traffic controlling method of claim 11, including monitoring an arriving condition of a backward RM cell, and when no backward RM cell is detected, automatically transmitting a backward RM cell.

18. The ATM traffic controlling method of claim 11, including monitoring the arriving condition of the data for the data connection, and selecting a cycle for which the data ATM terminals change transmission rate when a backward RM cell is not detected.

19. The ATM traffic controlling method of claim 11, automatically correcting the prediction coefficient for calculating the number of sound cells arriving during the second cycle based on the arriving condition of the sound cells for the plurality of sound connections.

20. The ATM traffic controlling method of claim 11, including storing the sound cells and the data cells separately, and determining the transmission rate of the data traffic based on storing of the data cells and the arriving condition of the sound cells in the plurality of sound connections.

* * * * *